United States Patent
Liang et al.

(10) Patent No.: US 12,438,659 B2
(45) Date of Patent: Oct. 7, 2025

(54) MICROWAVE DATA PROCESSING METHOD AND APPARATUS, AND DEVICE

(71) Applicant: HUAWEI TECHNOLOGIES CO., LTD., Shenzhen (CN)

(72) Inventors: Bo Liang, Shenzhen (CN); De Xu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 252 days.

(21) Appl. No.: 18/066,495

(22) Filed: Dec. 15, 2022

(65) Prior Publication Data

US 2023/0155757 A1 May 18, 2023

Related U.S. Application Data

(63) Continuation of application No. PCT/CN2021/088060, filed on Apr. 19, 2021.

(30) Foreign Application Priority Data

Jun. 18, 2020 (CN) .......................... 202010560238.5

(51) Int. Cl.
*H04L 12/28* (2006.01)
*H04L 5/00* (2006.01)

(52) U.S. Cl.
CPC .......... *H04L 5/0046* (2013.01); *H04L 5/0005* (2013.01); *H04L 5/0048* (2013.01)

(58) Field of Classification Search
CPC ..... H04L 5/003; H04L 5/0042; H04L 5/0044; H04L 5/0046; H04L 5/0048;

(Continued)

(56) References Cited

U.S. PATENT DOCUMENTS

2012/0224691 A1   9/2012  Purohit
2013/0311848 A1*  11/2013  Purohit ................. H04L 1/0057
                                                                    714/752

(Continued)

FOREIGN PATENT DOCUMENTS

CN   101478476 A   7/2009
CN   101631327 A   1/2010

(Continued)

OTHER PUBLICATIONS

RAN WG3 Meeting #92, R3-161134, Huawei:"Network slice selection", New Radio, Nanjing, China, May 23-27, 2016. 4 pages.

(Continued)

*Primary Examiner* — Elisabeth Benoit Magloire

(74) *Attorney, Agent, or Firm* — HAUPTMAN HAM, LLP

(57) ABSTRACT

A microwave data processing method, apparatus, and a device. A logical slice is obtained by slicing a microwave data stream, and an independent air interface resource is allocated to the logical slice, so that different logical slices are independent of each other, and then different logical slices are correspondingly encoded, so that encoded data that meets different transmission conditions is generated for different types of logical slices, thereby improving reliability of microwave data transmission, and increasing application scenarios of microwave data transmission.

20 Claims, 11 Drawing Sheets

(58) Field of Classification Search
CPC ..... H04L 5/0092; H04L 5/0094; H04L 5/023; H04L 5/22; H04L 5/26; H04L 5/0005
See application file for complete search history.

(56) References Cited

U.S. PATENT DOCUMENTS

| | | | |
|---|---|---|---|
| 2016/0365875 A1 | 12/2016 | Ko et al. | |
| 2019/0254013 A1* | 8/2019 | Chang | H04L 5/00 |
| 2019/0289528 A1* | 9/2019 | Lou | H04W 76/11 |
| 2020/0389876 A1* | 12/2020 | Islam | H04L 5/0094 |
| 2021/0007149 A1* | 1/2021 | Li | H04L 5/0091 |
| 2021/0092759 A1* | 3/2021 | Xiong | H04W 72/0446 |
| 2021/0152615 A1* | 5/2021 | Karampatsis | H04L 65/1016 |
| 2021/0185722 A1* | 6/2021 | Li | H04L 5/0044 |
| 2021/0194652 A1* | 6/2021 | Khoryaev | H04L 5/06 |
| 2021/0360741 A1* | 11/2021 | Shimojou | H04W 84/20 |

FOREIGN PATENT DOCUMENTS

| | | | | |
|---|---|---|---|---|
| CN | 103178930 A | 6/2013 | | |
| WO | WO-2011104182 A2 * | 9/2011 | ............ | H03M 13/11 |
| WO | WO-2018129147 A1 * | 7/2018 | ............ | H03M 13/09 |
| WO | 2018145723 A1 | 8/2018 | | |
| WO | WO-2018175820 A1 * | 9/2018 | ............ | H04L 1/1854 |
| WO | WO-2021222374 A1 * | 11/2021 | ............ | H04B 7/024 |

OTHER PUBLICATIONS

International Search Report issued in corresponding International Application No. PCT/CN2021/088060, dated Jul. 15, 2021, pp. 1-8.
Extended European Search Report issued in corresponding European Application No. 21825605.5, dated Oct. 25, 2023, pp. 1-11.

\* cited by examiner

| Slice type | Identifier of an air interface logical resource |
|---|---|
| Low latency | 01 |
| Normal latency | 02 |
| High bandwidth | 03 |
| ... | ... |

| Identifier of an air interface logical resource | Air interface physical resource | |
|---|---|---|
| | Subcarrier | Slot |
| 01 | 0 | 1-10 |
| 02 | 1 | 1-10 |
| 03 | 2 | 0 |
| ... | ... | ... |

MICROWAVE DATA PROCESSING METHOD AND APPARATUS, AND DEVICE

CROSS-REFERENCE TO RELATED APPLICATIONS

This application is a continuation of International Patent Application No. PCT/CN2021/088060, filed on Apr. 19, 2021, which claims priority to Chinese Patent Application No. 202010560238.5, filed on Jun. 18, 2020. The disclosures of the aforementioned applications are hereby incorporated in entirety by reference.

BACKGROUND

Microwave communication is a technology of using a microwave as a medium for data communication, which does not call for a solid medium, and has advantages such as a large communications capacity, good quality, and a long transmission distance, and therefore is widely used in various wireless communications solutions.

A microwave air interface is an interface for data transmission between microwave devices. In a conventional technology, the microwave air interface is used as a common physical interface, and data streams input to the microwave air interface are scheduled and sent based on a unified rule. Therefore, data transmission latencies and bandwidths are the same.

Then, in a 5G scenario, there are various types of applications, and different applications have different latency conditions. Some applications call for an extremely low latency, and some applications call for a larger bandwidth but are insensitive to a latency. Therefore, a conventional microwave air interface is unable to meet transmission conditions of different service data streams.

SUMMARY

Some embodiments provide a microwave data processing method and apparatus, and a device, to resolve a problem that a data transmission precondition is unable to be met because transmission with differentiated latencies is unable to be implemented for a data stream at a microwave air interface.

Some embodiments provide a microwave data processing method, including:

performing slicing processing on an obtained microwave data stream to obtain a logical slice; configuring an independent air interface resource for the logical slice based on a slice type of the logical slice; generating, by using the air interface resource, a physical slice corresponding to the logical slice; and encoding the physical slice based on preset forwarding configuration information, to generate encoded data that meets a data transmission precondition.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

In some embodiments, the air interface resource includes an air interface logical resource and an air interface physical resource, and the configuring an independent air interface resource for the logical slice based on a slice type of the logical slice includes: obtaining slice configuration information, where the slice configuration information is used to represent a mapping relationship between a slice type and an air interface logical resource; obtaining an air interface logical resource of the logical slice based on the slice configuration information, where different air interface logical resources are independent of each other; and configuring a corresponding air interface physical resource for the logical slice based on the air interface logical resource corresponding to the logical slice.

In some embodiments, a mapping between a slice type and an air interface logical resource is established by obtaining the configuration information used to represent the mapping relationship between a slice type and an air interface logical resource, and the air interface logical resource is configured for the logical slice based on the slice type of the logical slice and the mapping relationship. Then, the air interface physical resource is configured based on the air interface logical resource. Because air interface logical resources are independent of each other, that data is forwarded for different types of logical slices by using independent air interface physical resources, thereby meeting different data transmission conditions.

In some embodiments, the logical slice includes slice header information, and the slice header information is used to represent the slice type of the logical slice. The slice configuration information includes the mapping relationship between a slice type and an air interface logical resource. The obtaining an air interface logical resource of the logical slice based on the slice configuration information includes: obtaining the slice type of the logical slice based on the slice header information; and obtaining the air interface logical resource of the logical slice based on the slice configuration information and the slice type of the logical slice.

In some embodiments, the type of the logical slice is described in the slice header information in the logical slice, to distinguish between different types of logical slices and allocate air interface resources to different types of logical slices. Because the slice header information is configured based on a precondition, the slice type is flexibly described and extended in a manner in which the slice header information represents the slice type, thereby increasing an application scope and flexibility of the microwave data processing method provided in some embodiments.

In some embodiments, an identifier of the air interface logical resource is in a one-to-one correspondence with an identifier of the air interface physical resource, and the air interface physical resource includes a slot and/or a subcarrier. The configuring an air interface physical resource for the logical slice based on the air interface logical resource includes: obtaining an identifier of the air interface physical resource based on an identifier of the air interface logical resource of the logical slice; and configuring a slot and/or a subcarrier for the logical slice by using the air interface physical resource corresponding to the identifier of the air interface physical resource.

In some embodiments, the air interface physical resource is allocated to the logical slice by using the slot or the subcarrier as a carrier to carry the logical slice, and slots and subcarriers are independent of each other, so that different logical slices implements corresponding data transmission conditions without being affected by another logical slice, thereby improving stability of data stream transmission.

In some embodiments, the air interface resource includes a slot, and the generating, by using the air interface resource, a physical slice corresponding to the logical slice includes: mapping the logical slice to the slot, to form a slot group corresponding to the logical slice; and determining the slot group as the physical slice corresponding to the logical slice.

In some embodiments, the generating, by using the air interface resource, a physical slice corresponding to the logical slice includes: mapping the logical slice to a subcarrier to form a subchannel, where the logical slice is in a one-to-one correspondence with the subchannel; and determining the subchannel as the physical slice corresponding to the logical slice.

In some embodiments, the subcarrier includes a plurality of slots. After the mapping the logical slice to a subcarrier, the method further includes: mapping the logical slice on the subcarrier to the slots to form a slot group; and determining the slot group as the physical slice corresponding to the logical slice.

In some embodiments, the subcarrier and then the slot are used to generate the physical slice corresponding to the logical slice in a plurality of dimensions, so that multi-dimensional slicing is performed on the logical slice, to correspond to different slice types. Therefore, logical slices of more slice types is processed, thereby increasing an application scope of the microwave data processing method provided in some embodiments.

In some embodiments, the microwave data stream includes a microwave data fragment, and the performing slicing processing on an obtained microwave data stream to obtain a logical slice includes: obtaining the microwave data fragment; identifying the microwave data fragment based on a preset slice matching rule to obtain a slice feature; and adding slice header information to the microwave data fragment based on the slice feature to generate a logical slice, where the logical slice is in a one-to-one correspondence with the microwave data fragment.

In some embodiments, the forwarding configuration information includes a mapping relationship between a physical slice and an encoding rule, and the encoding the physical slice based on preset forwarding configuration information, to generate encoded data that meets a data transmission precondition includes: obtaining an encoding rule of the physical slice based on the forwarding configuration information; and encoding the physical slice based on the encoding rule, to obtain encoded data with transmission performance.

In some embodiments, physical slices corresponding to different air interface physical resources are encoded based on different encoding rules. Because different encoding rules have corresponding encoding characteristics, encoded data after encoding has transmission performance Therefore, encoded data with transmission performance, for example, low-latency encoded data, is generated by encoding the physical slices by using different encoding rules, and the encoded data meets different data transmission conditions.

In some embodiments, the encoding rule is RS encoding and/or LDPC encoding.

In some embodiments, the microwave data stream includes a plurality of microwave data fragments, and before the performing slicing processing on an obtained microwave data stream to obtain a logical slice, the method further includes: obtaining the plurality of microwave data fragments; adding time sequence identifiers to the microwave data fragments based on a time sequence of the microwave data fragments in the microwave data stream; and sending, based on a preset traffic balancing policy, the plurality of microwave data fragments to a plurality of microwave air interfaces based on the time sequence identifiers, as microwave data streams of different microwave air interfaces, where there is a mapping relationship between the traffic balancing policy and air interface resources of the microwave air interfaces.

In some embodiments, in a scenario in which a plurality of microwave air interfaces are bundled as a whole for microwave data transmission, microwave data fragments are out of sequence during multi-path transmission, and time sequence identifiers are added to microwave data fragment in a microwave data stream, to preserve a sequence of the microwave data fragments. Then, the microwave data fragments after the sequence preserving are sent to a plurality of microwave air interfaces based on a preset traffic balancing policy, so that the plurality of microwave air interfaces obtains microwave data streams after traffic balancing. Because the microwave data streams obtained by the plurality of microwave air interfaces are related to air interface resources of the plurality of microwave air interfaces, balance of subsequent air interface resource allocation performed by the plurality of microwave air interfaces is improved, thereby improving comprehensive transmission efficiency of microwave data.

Some embodiments provide a microwave data processing apparatus, including:

a slice identification module, configured to perform slicing processing on an obtained microwave data stream to obtain a logical slice; a slice scheduling module, configured to configure an independent air interface resource for the logical slice based on a slice type of the logical slice; a slice mapping module, configured to generate, by using the air interface resource, a physical slice corresponding to the logical slice; and a latency selection module, configured to encode the physical slice based on preset forwarding configuration information, to generate encoded data that meets a data transmission precondition.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

In some embodiments, the air interface resource includes an air interface logical resource and an air interface physical resource, and the slice scheduling module is specifically configured to: obtain slice configuration information, where the slice configuration information is used to represent a mapping relationship between a slice type and an air interface logical resource; obtain an air interface logical resource of the logical slice based on the slice configuration information, where different air interface logical resources are independent of each other; and configure a corresponding air interface physical resource for the logical slice based on the air interface logical resource corresponding to the logical slice.

In some embodiments, a mapping between a slice type and an air interface logical resource is established by obtaining the configuration information used to represent the mapping relationship between a slice type and an air interface logical resource, and the air interface logical resource is configured for the logical slice based on the slice type of the logical slice and the mapping relationship. Then, the air interface physical resource is configured based on the air interface logical resource. Because air interface logical resources are independent of each other, that data is forwarded for different types of logical slices by using independent air interface physical resources, thereby meeting different data transmission conditions.

In some embodiments, the logical slice includes slice header information, and the slice header information is used to represent the slice type of the logical slice. The slice configuration information includes the mapping relationship between a slice type and an air interface logical resource. In response to obtaining the air interface logical resource of the logical slice based on the slice configuration information, the slice scheduling module is specifically configured to: obtain the slice type of the logical slice based on the slice header information; and obtain the air interface logical resource of the logical slice based on the slice configuration information and the slice type of the logical slice.

In some embodiments, the type of the logical slice is described in the slice header information in the logical slice, to distinguish between different types of logical slices and allocate air interface resources to different types of logical slices. Because the slice header information is configured based on a precondition, the slice type is flexibly described and extended in a manner in which the slice header information represents the slice type, thereby increasing an application scope and flexibility of the microwave data processing method provided in some embodiments.

In some embodiments, an identifier of the air interface logical resource is in a one-to-one correspondence with an identifier of the air interface physical resource, and the air interface physical resource includes a slot and/or a subcarrier. In response to configuring the air interface physical resource for the logical slice based on the air interface logical resource, the slice scheduling module is specifically configured to: obtain an identifier of the air interface physical resource based on an identifier of the air interface logical resource of the logical slice; and configure a slot and/or a subcarrier for the logical slice by using the air interface physical resource corresponding to the identifier of the air interface physical resource.

In some embodiments, the air interface physical resource is allocated to the logical slice by using the slot or the subcarrier as a carrier to carry the logical slice, and slots and subcarriers are independent of each other, so that different logical slices implements corresponding data transmission conditions without being affected by another logical slice, thereby improving stability of data stream transmission.

In some embodiments, the air interface resource includes a subcarrier, and the slice mapping module is specifically configured to: map the logical slice to the subcarrier to form a subchannel, where the logical slice is in a one-to-one correspondence with the subchannel; and determine the subchannel as the physical slice corresponding to the logical slice.

In some embodiments, the subcarrier includes a plurality of slots. After mapping the logical slice to the subcarrier, the slice mapping module is specifically configured to: map the logical slice on the subcarrier to the slots to form a slot group; and determine the slot group as the physical slice corresponding to the logical slice.

In some embodiments, the air interface resource includes a slot, and the slice mapping module is specifically configured to: map the logical slice to the slot, to form a slot group corresponding to the logical slice; and determine the slot group as the physical slice corresponding to the logical slice.

In some embodiments, the subcarrier and then the slot are used to generate the physical slice corresponding to the logical slice in a plurality of dimensions, so that multi-dimensional slicing is performed on the logical slice, to correspond to different slice types. Therefore, logical slices of more slice types is processed, thereby increasing an application scope of the microwave data processing method provided in some embodiments.

In some embodiments, the microwave data stream includes a microwave data fragment, and the slice identification module is specifically configured to: obtain the microwave data fragment; identify the microwave data fragment based on a preset slice matching rule to obtain a slice feature; and add slice header information to the microwave data fragment based on the slice feature to generate a logical slice, where the logical slice is in a one-to-one correspondence with the microwave data fragment.

In some embodiments, the forwarding configuration information includes a mapping relationship between a physical slice and an encoding rule, and the latency selection module is specifically configured to: obtain an encoding rule of the physical slice based on the forwarding configuration information; and encode the physical slice based on the encoding rule, to obtain encoded data with transmission performance.

In some embodiments, physical slices corresponding to different air interface physical resources are encoded based on different encoding rules. Because different encoding rules have corresponding encoding characteristics, encoded data after encoding has transmission performance Therefore, encoded data with transmission performance, for example, low-latency encoded data, is generated by encoding the physical slices by using different encoding rules, and the encoded data meets different data transmission conditions.

In some embodiments, the encoding rule is RS encoding and/or LDPC encoding.

In some embodiments, the microwave data stream includes a plurality of microwave data fragments, and the microwave data processing apparatus further includes an air interface scheduling module, configured to: obtain the plurality of microwave data fragments; add time sequence identifiers to the microwave data fragments based on a time sequence of the microwave data fragments in the microwave data stream; and send, based on a preset traffic balancing policy, the plurality of microwave data fragments to a plurality of microwave air interfaces based on the time sequence identifiers, as microwave data streams of different microwave air interfaces, where there is a mapping relationship between the traffic balancing policy and air interface resources of the microwave air interfaces.

In some embodiments, in a scenario in which a plurality of microwave air interfaces are bundled as a whole for microwave data transmission, microwave data fragments are out of sequence during multi-path transmission, and time sequence identifiers are added to microwave data fragment in a microwave data stream, to preserve a sequence of the microwave data fragments. Then, the microwave data fragments after the sequence preserving are sent to a plurality of microwave air interfaces based on a preset traffic balancing policy, so that the plurality of microwave air interfaces obtains microwave data streams after traffic balancing. Because the microwave data streams obtained by the plurality of microwave air interfaces are related to air interface resources of the plurality of microwave air interfaces, balance of subsequent air interface resource allocation performed by the plurality of microwave air interfaces is improved, thereby improving comprehensive transmission efficiency of microwave data.

Some embodiments provide a microwave indoor unit. The microwave indoor unit includes a packet switching unit and an intermediate frequency unit, and the packet switching unit and the intermediate frequency unit are electrically connected. The packet switching unit is configured to perform slicing processing on an obtained microwave data stream to obtain a logical slice. The intermediate frequency unit is configured to: configure an independent air interface resource for the logical slice based on a slice type of the logical slice, generate, by using the air interface resource, a physical slice corresponding to the logical slice, and encode the physical slice based on preset forwarding configuration information, to generate encoded data that meets a data transmission precondition.

In some embodiments, the air interface resource includes an air interface logical resource and an air interface physical resource, and the intermediate frequency unit is specifically configured to: obtain slice configuration information, where the slice configuration information is used to represent a mapping relationship between a slice type and an air interface logical resource; obtain an air interface logical resource of the logical slice based on the slice configuration information, where different air interface logical resources are independent of each other; and configure a corresponding air interface physical resource for the logical slice based on the air interface logical resource corresponding to the logical slice.

In some embodiments, the air interface resource includes an air interface logical resource and an air interface physical resource, and in response to configuring the independent air interface resource for the logical slice based on the slice type of the logical slice, the intermediate frequency unit is specifically configured to: obtain slice configuration information, where the slice configuration information is used to represent a mapping relationship between a slice type and an air interface logical resource; obtain an air interface logical resource of the logical slice based on the slice configuration information, where different air interface logical resources are independent of each other; and configure a corresponding air interface physical resource for the logical slice based on the air interface logical resource corresponding to the logical slice.

In some embodiments, the logical slice includes slice header information, and the slice header information is used to represent the slice type of the logical slice. The slice configuration information includes the mapping relationship between a slice type and an air interface logical resource. In response to obtaining the air interface logical resource of the logical slice based on the slice configuration information, the intermediate frequency unit is specifically configured to: obtain the slice type of the logical slice based on the slice header information; and obtain the air interface logical resource of the logical slice based on the slice configuration information and the slice type of the logical slice.

In some embodiments, an identifier of the air interface logical resource is in a one-to-one correspondence with an identifier of the air interface physical resource, and the air interface physical resource includes a slot and/or a subcarrier. In response to configuring the air interface physical resource for the logical slice based on the air interface logical resource, the intermediate frequency unit is specifically configured to: obtain an identifier of the air interface physical resource based on an identifier of the air interface logical resource of the logical slice; and configure a slot and/or a subcarrier for the logical slice by using the air interface physical resource corresponding to the identifier of the air interface physical resource.

In some embodiments, the air interface resource includes a subcarrier, and in response to generating, by using the air interface resource, the physical slice corresponding to the logical slice, the intermediate frequency unit is specifically configured to: map the logical slice to the subcarrier to form a subchannel, where the logical slice is in a one-to-one correspondence with the subchannel; and determine the subchannel as the physical slice corresponding to the logical slice.

In some embodiments, the subcarrier includes a plurality of slots. After mapping the logical slice to the subcarrier, the intermediate frequency unit is specifically configured to: map the logical slice on the subcarrier to the slots to form a slot group; and determine the slot group as the physical slice corresponding to the logical slice.

In some embodiments, the air interface resource includes a slot, and in response to generating, by using the air interface resource, the physical slice corresponding to the logical slice, the intermediate frequency unit is specifically configured to: map the logical slice to the slot, to form a slot group corresponding to the logical slice; and determine the slot group as the physical slice corresponding to the logical slice.

In some embodiments, the packet switching unit is specifically configured to: obtain a microwave data fragment; identify the microwave data fragment based on a preset slice matching rule to obtain a slice feature; and add slice header information to the microwave data fragment based on the slice feature to generate a logical slice, where the logical slice is in a one-to-one correspondence with the microwave data fragment.

In some embodiments, the forwarding configuration information includes a mapping relationship between a physical slice and an encoding rule, and in response to encoding the physical slice based on the preset forwarding configuration information, to generate the encoded data that meets the data transmission precondition, the intermediate frequency unit is specifically configured to: obtain an encoding rule of the physical slice based on the forwarding configuration information; and encode the physical slice based on the encoding rule, to obtain encoded data with transmission performance.

In some embodiments, the encoding rule is RS encoding and/or LDPC encoding.

Some embodiments provide a microwave device, including a processor, a memory, and a transceiver.

The processor is configured to control the transceiver to send and receive signals. The memory is configured to store a computer program. The processor is further configured to invoke and run the computer program stored in the memory, to enable the microwave device to perform the method provided in any implementation of the first aspect.

Some embodiments provide a computer-readable storage medium, including computer code. In response to the computer code being run on a computer, the computer is enabled to perform the method provided in any implementation of the first aspect.

Some embodiments provide a computer program product, including program code. In response to a computer running the computer program product, the program code performs the method provided in any implementation of the first aspect.

Some embodiments provide a chip, including a processor. The processor is configured to invoke and run a computer program stored in a memory, to perform a corresponding operation and/or procedure performed by the microwave device in the microwave data processing method in the embodiments. Optionally, the chip further includes the memory. The memory and the processor are connected by using a circuit or a wire, and the processor is configured to read the computer program in the memory and execute the computer program. Further, optionally, the chip further includes a communications interface, and the processor is connected to the communications interface. The communications interface is configured to receive data and/or information that needs to be processed. The processor obtains the data and/or information from the communications interface, and processes the data and/or information. The communications interface is an input/output interface.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

DESCRIPTION OF EMBODIMENTS

Some embodiments are applied to a fifth-generation mobile communications network (5G) communications system or another system that appears in the future, and further is applied to another communications system, for example, a wireless local area network (WLAN) system, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), or a worldwide interoperability for microwave access (WiMAX) communications System.

In the following, some terms in some embodiments are described, so as to help persons skilled in the art have a better understanding. In response to solutions in the embodiments being applied to a 5G system, an existing system, or another system that appears in the future, names of a network device and a terminal device changes, but this does not affect implementation of the solutions in the embodiments.

(1) The term "a/the plurality of" means two or more than two, and other quantifiers are similar thereto. The term "and/or" describes an association relationship for describing associated objects and represents that three relationships exists. For example, A and/or B represents the following three cases: A exists, both A and B exist, and B exists. The character "/" usually indicates an "or" relationship between associated objects.

(2) The term "corresponding" refers to an association relationship or a binding relationship, and A corresponding to B refers to an association relationship or a binding relationship between A and B.

Nouns or terms in the embodiments is referred to each other, and are not described again.

Figure 1:
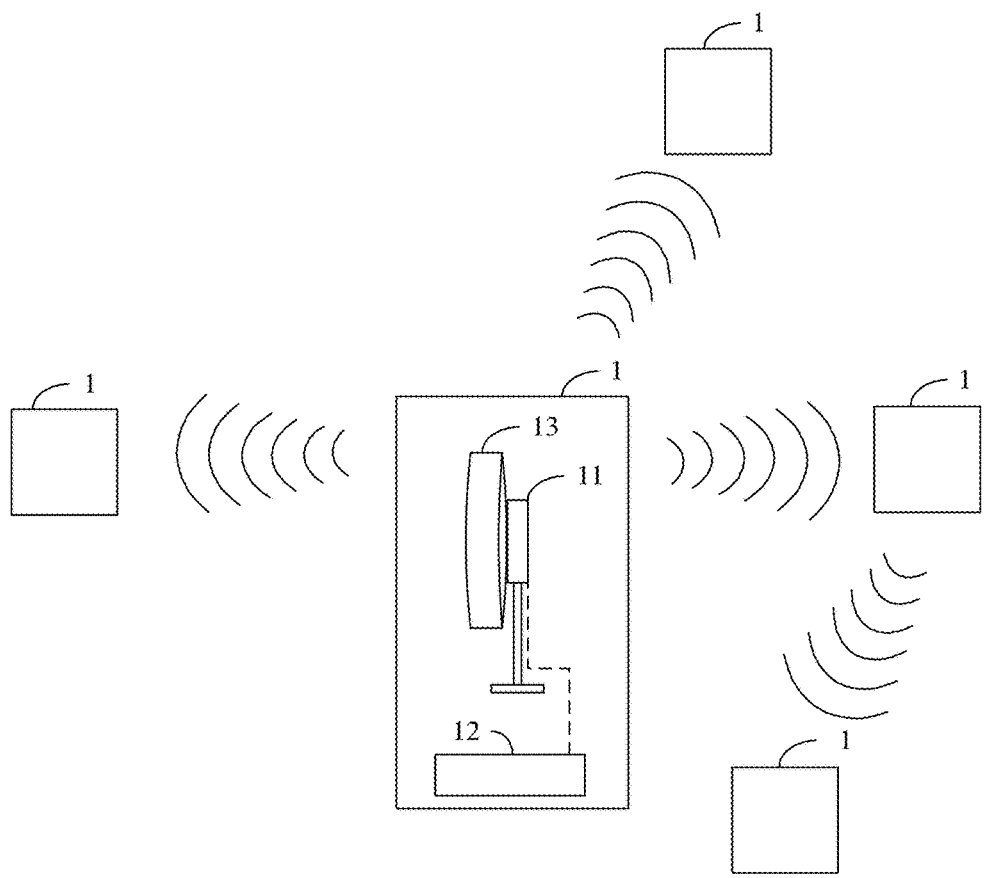
FIG. 1 is a diagram of a system architecture according to some embodiments.

FIG. 1 is a diagram of a system architecture according to some embodiments. As shown in FIG. 1, the system architecture includes a plurality of microwave devices 1 that are communicatively connected to each other. For example, the microwave device 1 is a split microwave device. The split microwave device includes an outdoor unit 11 (ODU), an indoor unit 12 (IDU), and an antenna system 13. The outdoor unit 11 is connected to the antenna system 13, to send and receive radio frequency microwave signals. The indoor unit 12 is connected to the outdoor unit 11 by using a cable, and receives an intermediate frequency signal from and transmits an intermediate frequency signal to the outdoor unit 11 by using the cable. The plurality of microwave devices 1 communicate with each other by using microwaves, to implement microwave networking. There are a plurality of manners for microwave networking, such as a chain type, a tree type, a star type, and a ring type. FIG. 1 shows a microwave networking manner of a star structure, and a plurality of pieces of data and information are transferred by using the plurality of microwave devices networked in the star structure.

In a conventional technology, an air interface of the microwave device is used as a common physical interface for, for example, data transmission between two microwave devices. Data streams input to the microwave air interface are scheduled and sent based on a unified rule. Therefore, data transmission latencies and bandwidths are the same. However, in a 5G scenario, because a higher precondition is posed to a transmission latency of a data stream, transmission with differentiated latencies is unable to be implemented after different data streams enter the microwave air interface.

Figure 2:
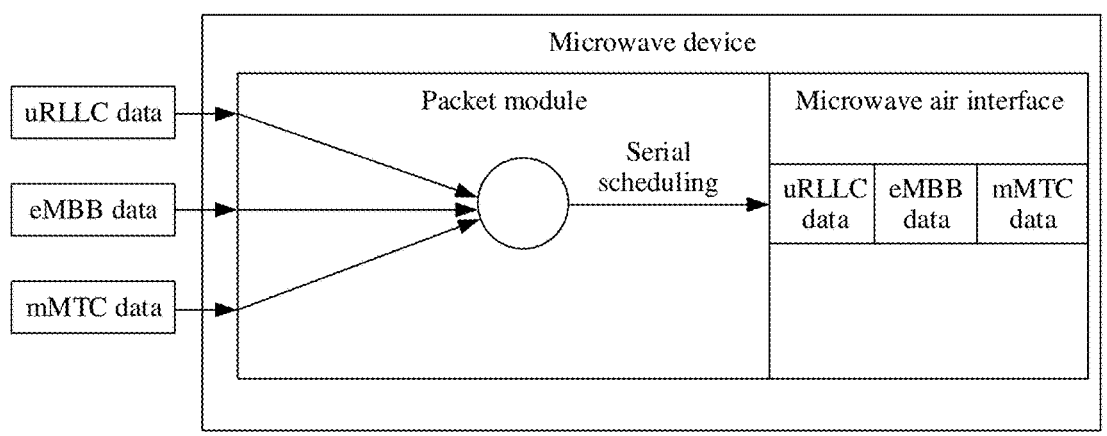
FIG. 2 is a schematic diagram of performing data transmission for a data stream by using a microwave air interface in a 5G scenario according to some embodiments.

FIG. 2 is a schematic diagram of performing data transmission for a data stream by using a microwave air interface in a 5G scenario according to some embodiments. As shown in FIG. 2, for example, in the 5G scenario, a data stream that accesses a microwave device includes three types of data with different transmission conditions: ultra-reliable and low latency communications (uRLLC) data, enhanced mobile broadband (eMBB) data, and massive machine type communication (mMTC) data. The uRLLC data is used as an example. Because the uRLLC data generally corresponds to self-driving or other application scenarios with an extremely high real-time performance precondition, the data is called for to have an extremely low latency, and a bandwidth is relatively small. The eMBB data calls for a medium latency and a large bandwidth. The mMTC data has no latency precondition, a large latency is accepted, and generally, a bandwidth precondition is relatively low. Because the bandwidth and the latency are opposite, to achieve a large bandwidth and a low latency at the same time is difficult. The uRLLC data, the eMBB data, and the mMTC data have different transmission conditions on the bandwidth and the latency. In a conventional technology, a packet module in the microwave device indiscriminately performs serial scheduling on the three types of data to a microwave air interface for data transmission. That is, data transmission of the three types of data needs to be performed by using a fixed microwave air interface as a pipeline. Therefore, a precondition for a low latency is unable to be met for data such as the uRLLC data that has a relatively high latency precondition, or a precondition for a large bandwidth is unable to be met for data such as the mMTC data.

To resolve the foregoing problem that a data transmission precondition is unable to be met because transmission with differentiated latencies is unable to be implemented for a data stream at a microwave air interface, the following describes, in detail by using embodiments, the technical solutions of some embodiments and how the technical solutions of some embodiments resolve the foregoing technical problem. The following several embodiments are combined with each other, and a same or similar concept or process is unable to be described repeatedly in some embodiments. The following describes embodiments with reference to the accompanying drawings.

Figure 3:
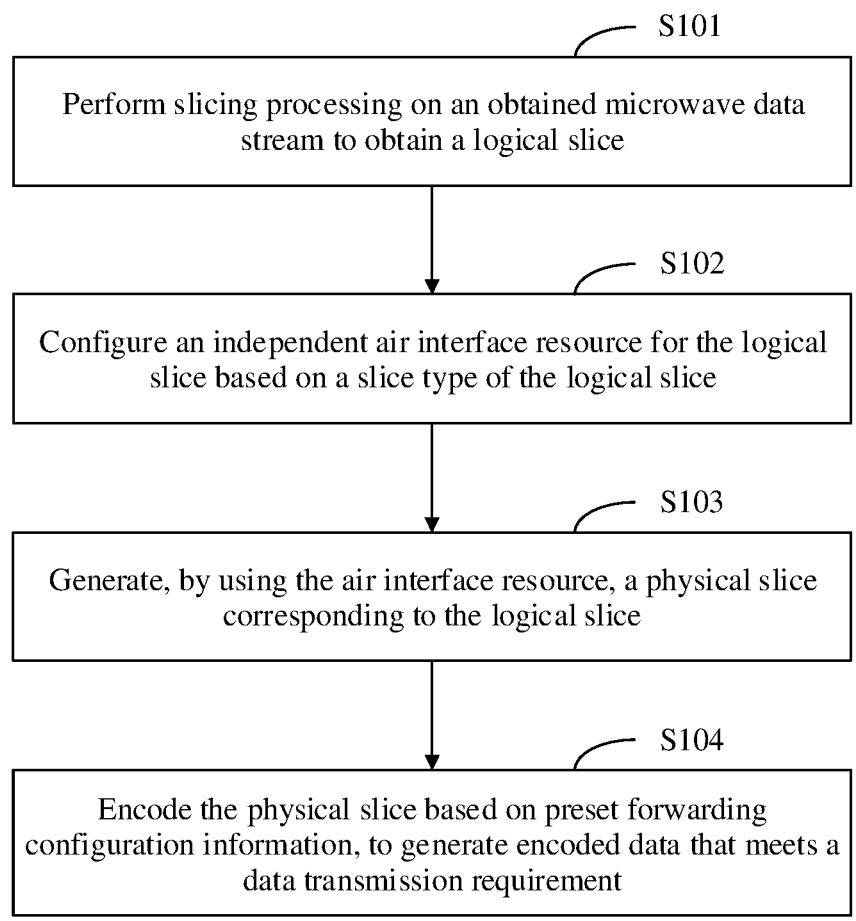
FIG. 3 is a flowchart of a microwave data processing method according to some embodiments.

FIG. 3 is a flowchart of a microwave data processing method according to some embodiments. The method is executed by a microwave device, for example, an indoor unit. As shown in FIG. 3, the method includes the following steps.

S101. Perform slicing processing on an obtained microwave data stream to obtain a logical slice.

Figure 4:
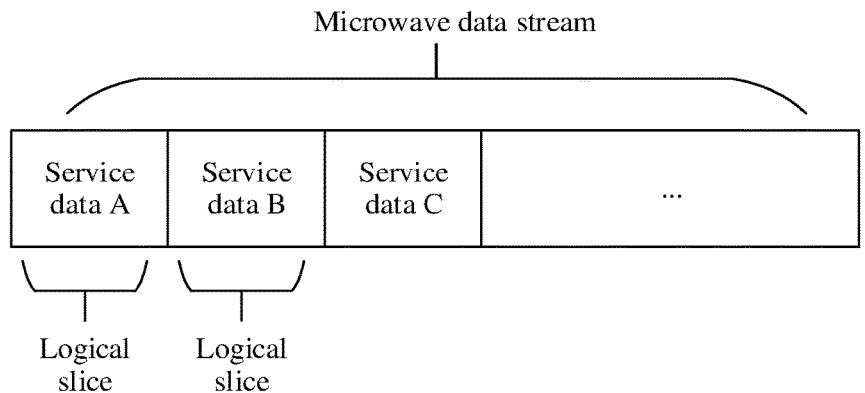
FIG. 4 is a schematic diagram of performing slicing processing on a microwave data stream according to some embodiments.

For example, the microwave data stream is microwave data that accesses the microwave device, such as an Ethernet stream. The microwave data stream includes a plurality of frames of data, and each frame of data corresponds to a different data type. Further, different types of data corresponds to different services. For example, a first frame of data is uRLLC data, and corresponds to data of a self-driving service, and a second frame of data is eMBB data, and corresponds to a video service. FIG. 4 is a schematic diagram of performing slicing processing on a microwave data stream according to some embodiments. As shown in FIG. 4, one or a combination of a plurality of frames of data in the microwave data stream corresponds to a segment of service data, and each segment of service data corresponds to a different transmission precondition. Slice processing is performed on each segment of service data to generate a plurality of logical slices. Each logical slice corresponds to a segment of service data.

Specifically, each corresponding segment of service data in the microwave data stream is sliced in a plurality of manners. For example, the microwave data stream includes one or more packets, and a protocol field in the packet is parsed and identified, to determine a segmentation location of the service data in the microwave data stream; or a segmentation location of the service data in the microwave data stream is determined based on a length, header information, or the like of the packet in the microwave data stream, to implement slicing processing on the microwave data stream, to obtain a logical slice corresponding to the service data.

S102. Configure an independent air interface resource for the logical slice based on a slice type of the logical slice.

Specifically, there is a correspondence between a logical slice and service data, and the service data has a data feature. Therefore, a corresponding logical slice also has a corresponding logical slice feature, and different logical slice features are slice types corresponding to different logical slices. For example, a slice type of a logical slice A is a, and corresponds to service data of a uRLLC type, a slice type of a logical slice B is b, and corresponds to service data of an eMBB type, and the slice types of the logical slice A and the logical slice B are different. Correspondingly, independent air interface resources are configured for the logical slice A and the logical slice B, to implement independent processing and independent forwarding on the logical slice A and the logical slice B. In this case, implementing parallel processing on the logical slice A and the logical slice B by allocating air interface resources is equivalent, that is, implementing parallel processing on the service data corresponding to the logical slice A and the service data corresponding to the logical slice B.

For example, based on a data transmission precondition, the air interface resource is implemented in a plurality of forms, for example, a slot, a subcarrier, or a combination of the two.

That is, different slots, subcarriers, or combinations of the two are allocated to logical slices, to achieve an objective of configuring independent air interface resources for different types of logical slices.

S103. Generate, by using the air interface resource, a physical slice corresponding to the logical slice.

Specifically, the logical slice is obtained by logically slicing the microwave data stream, and the microwave data stream is still merged data. The physical slice is a data slice obtained after the logical slice is instantiated, that is, slice data obtained after the microwave data stream is physically sliced.

For example, the air interface resource includes a slot and a subcarrier. There are a plurality of implementations of generating, by using the air interface resource, a physical slice corresponding to the logical slice. For example, the logical slice is mapped to different slots based on the slot and the subcarrier. For another example, the logical slice is mapped to the subcarrier, to implement physical slicing of the logical slice, and generate a physical slice carried in the slot and the subcarrier. A implementation is selected based on a precondition, and is not specifically limited herein.

S104. Encode the physical slice based on preset forwarding configuration information, to generate encoded data that meets a data transmission precondition.

After the physical slice is generated, the microwave device needs to encode the physical slice to generate encoded data for subsequent data transmission. The physical slice is encoded in a plurality of manners, and encoded data with different data transmission characteristics is generated by encoding the physical slice in different encoding manners. For example, in response to a Reed-Solomon code (Reed-Solomon code, RS) being used for encoding, encoded data generated after the encoding has a relatively low latency, but also has a relatively small transmission bandwidth. in response to low-density parity-check (Low-density Parity-check, LDPC) being used for encoding, encoded data generated after the encoding has a relatively high latency, but also reaches an optimal transmission bandwidth.

For example, the forwarding configuration information includes a policy for encoding different physical slices. For example, RS encoding is performed for the physical slice A in a slot, and LDPC encoding is performed for the physical slice B on a subcarrier, so that different physical slices are encoded in corresponding encoding manners, to have data transmission characteristics. That is, encoded data generated for the physical slice A has a low-latency transmission characteristic, and encoded data generated for the physical slice B has a high-bandwidth transmission characteristic. Therefore, both the encoded data corresponding to the physical slice A and the encoded data corresponding to the physical slice B meets respective data transmission conditions, thereby implementing data transmission with differentiated latencies on the microwave air interface.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

Figure 5:
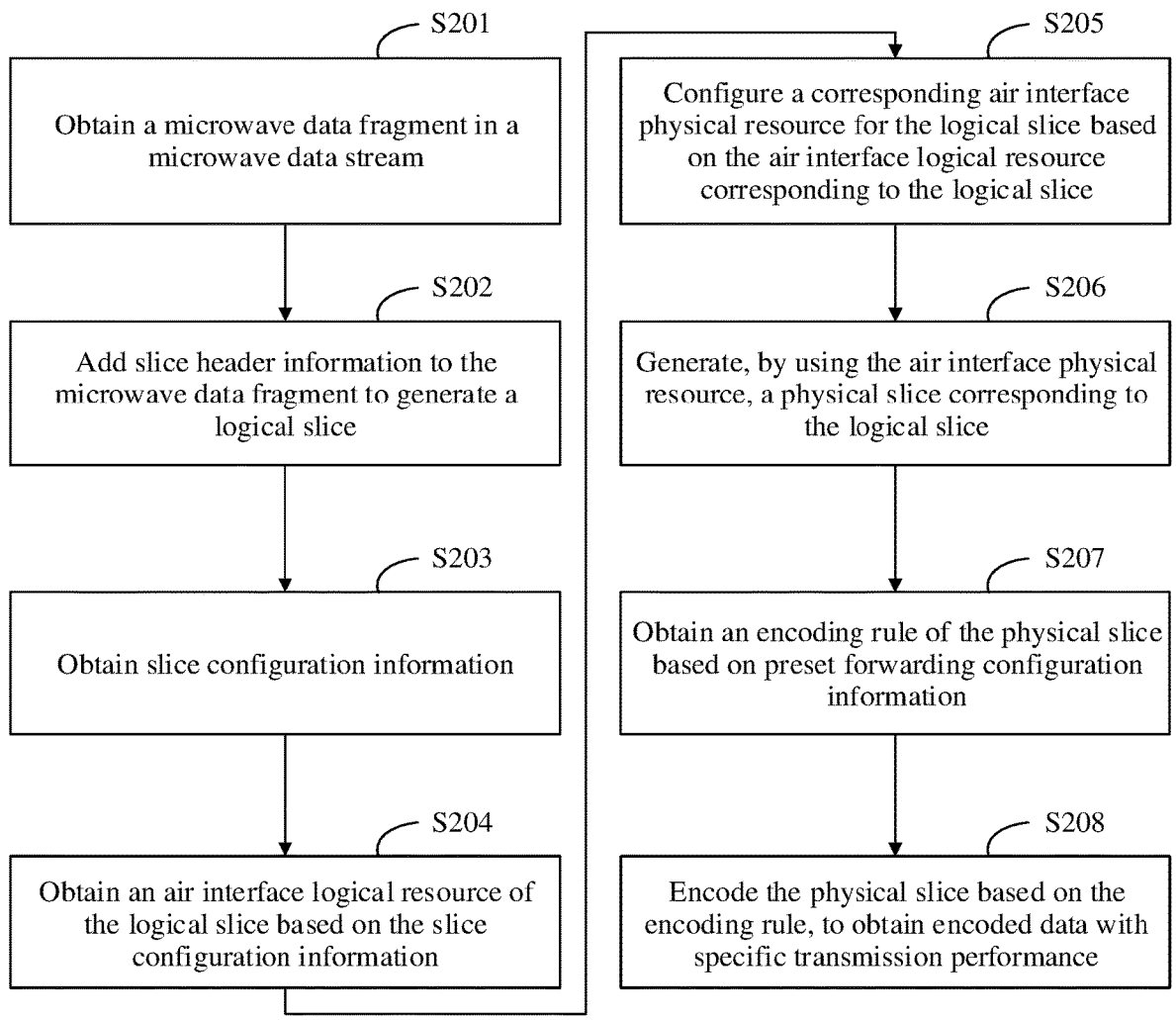
FIG. 5 is a flowchart of another microwave data processing method according to some embodiments.

FIG. 5 is a flowchart of another microwave data processing method according to some embodiments. As shown in FIG. 5, in the microwave data processing method provided in this embodiment, steps S101 to S104 are further refined based on the microwave data processing method provided in the embodiment shown in FIG. 3. The method includes the following steps.

S201. Obtain a microwave data fragment in a microwave data stream.

For example, a microwave data stream includes a microwave data fragment. Each microwave data fragment corresponds to one or more frames of data. Each microwave data fragment corresponds to a different data type, and different types of data corresponds to different services. Therefore, each microwave data fragment corresponds to a group of service data. The microwave data fragment in the microwave data stream is identified by parsing and reading information of the microwave data fragment, to obtain the microwave data fragment in the microwave data stream. A implementation is a conventional technology in the art, and details are not described herein.

S202. Add slice header information to the microwave data fragment to generate a logical slice.

Because microwave data fragments correspond to different service data, to process the microwave data fragments respectively in different manners subsequently, so that the microwave data fragments meet transmission conditions corresponding to the service data, the microwave data fragments need to be labeled, so that different microwave data fragments is distinguished. A manner of labeling a microwave data fragment is to add slice header information to a slice of the microwave data fragment. For convenience of implementation, the slice header information is added to a header or a tail of the microwave data fragment, or certainly, is added at another location of the microwave data fragment. This is not specifically limited herein. The slice header information is implemented in a plurality of manners, for example, adding a field or an identification number. Different implementations are used as required. After the slice header information is added to the microwave data fragment, a new slice formed is a logical slice, and different types of logical slices are distinguished by using slice header information.

S203. Obtain slice configuration information.

The slice configuration information is used to represent a mapping relationship between a slice type and an air interface logical resource, and an air interface logical resource corresponding to a logical slice of a slice type is determined based on the slice configuration information. For example, based on the slice configuration information, an air interface logical resource is allocated to a logical slice whose slice type is uRLLC data, so that in response to data being forwarded by using the air interface logical resource, the logical slice meets a data transmission precondition, that is, a low-latency data transmission precondition. For another example, based on the slice configuration information, an air interface logical resource is allocated to a logical slice whose slice type is eMBB data, so that in response to data being forwarded by using the air interface logical resource, the logical slice meets a data transmission precondition, that is, a medium-latency and large-bandwidth data transmission precondition.

S204. Obtain an air interface logical resource of the logical slice based on the slice configuration information.

For example, the slice configuration information includes the mapping relationship between a slice type and an air interface logical resource.

Figures 5A, 5B, 5C:
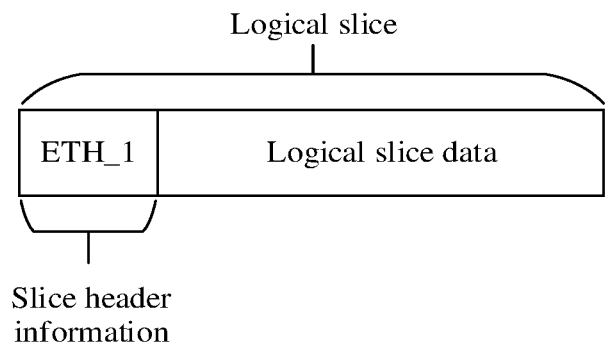
FIG. 5A is a schematic diagram of a piece of slice configuration information according to some embodiments.
FIG. 5B is a schematic diagram of a structure of slice header information according to some embodiments.
FIG. 5C is a schematic diagram of another piece of slice configuration information according to some embodiments.

A slice type of the logical slice is obtained based on the slice header information. Then, based on the slice configuration information and the slice type of the logical slice, mutually independent air interface logical resources corresponding to different types of logical slices are obtained. FIG. 5A is a schematic diagram of a piece of slice configuration information according to some embodiments. As shown in FIG. 5A, there is a mapping relationship between a slice type and an air interface logical resource. For different slice types, corresponding air interface logical resources are determined based on the slice configuration information shown in FIG. 5A.

In some embodiments, the logical slice includes slice header information, and the slice header information is used to represent the slice type of the logical slice. FIG. 5B is a schematic diagram of a structure of slice header information according to some embodiments. As shown in FIG. 5B, for example, to improve efficiency of parsing the slice header information, the slice header information is set at a header location of the logical slice. Certainly, in some embodiments, the slice header information alternatively is set at other locations of the logical slice, and examples are not provided herein one by one. For example, the slice header information is identification information that is set in the logical slice to distinguish the slice type corresponding to the logical slice. The identification information is information such as a numerical value, a letter, a symbol, or a combination thereof, for example, ETH_1 or VLAN_2. The corresponding slice type is determined based on the identification information.

In this embodiment, the type of the logical slice is described in the slice header information in the logical slice, to distinguish between different types of logical slices and allocate air interface resources to different types of logical slices. Because the slice header information is configured based on a precondition, the slice type is flexibly described and extended in a manner in which the slice header information represents the slice type, thereby increasing an application scope and flexibility of the microwave data processing method provided in some embodiments.

S205. Configure a corresponding air interface physical resource for the logical slice based on the air interface logical resource corresponding to the logical slice.

For example, an identifier of the air interface logical resource is in a one-to-one correspondence with an identifier of the air interface physical resource, and the air interface physical resource includes a slot and/or a subcarrier. FIG. 5C is a schematic diagram of another piece of slice configuration information according to some embodiments. As shown in FIG. 5C, an identifier of an air interface logical resource is in a one-to-one correspondence with an identifier of an air interface physical resource. The air interface physical resource includes a slot and/or a subcarrier. Based on the preset slice configuration information shown in FIG. 5B, the air interface physical resource corresponding to the air interface logical resource is determined. An identification number corresponding to a subcarrier represents a corresponding subcarrier, for example, a subcarrier 0, a subcarrier 1, or a subcarrier 2. An identification number corresponding to a slot, for example, 1-10, represents slots 1 to 10. An identification number 0 represents slots on a subcarrier. More specifically, an implementation step of configuring a corresponding air interface physical resource for the logical slice includes: obtaining an identifier of the air interface physical resource based on an identifier of the air interface logical resource of the logical slice; and configuring a slot and/or a subcarrier for the logical slice by using the air interface physical resource corresponding to the identifier of the air interface physical resource.

In this embodiment, a mapping between a slice type and an air interface logical resource is established by obtaining the configuration information used to represent the mapping relationship between a slice type and an air interface logical resource, and the air interface logical resource is configured for the logical slice based on the slice type of the logical slice and the mapping relationship. Then, the air interface physical resource is configured based on the air interface logical resource. Because air interface logical resources are independent of each other, that data is forwarded for different types of logical slices by using independent air interface physical resources, thereby meeting different data transmission conditions.

S206. Generate, by using the air interface physical resource, a physical slice corresponding to the logical slice.

Figure 6:
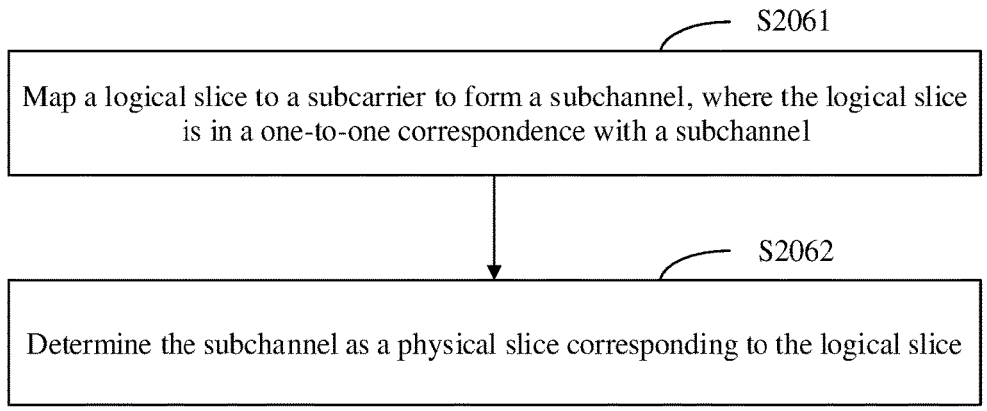
FIG. 6 is a flowchart of an implementation of step S206 in the embodiment shown in FIG. 5.

After the air interface physical resource is allocated to the logical slice, the physical slice is obtained by instantiating the logical slice by using the air interface physical resource. For example, as shown in FIG. 6, the air interface resource includes a subcarrier, and S206 includes two implementation steps of S2061 and S2062:

S2061. Map the logical slice to the subcarrier to form a subchannel, where the logical slice is in a one-to-one correspondence with the subchannel.

S2062. Determine the subchannel as the physical slice corresponding to the logical slice.

Specifically, after the subcarrier corresponding to the logical slice is determined, the corresponding logical slice is carried based on the subcarrier, and a channel corresponding to each subcarrier is a physical slice. A method for forming a channel based on a subcarrier is not described herein.

Figure 7:
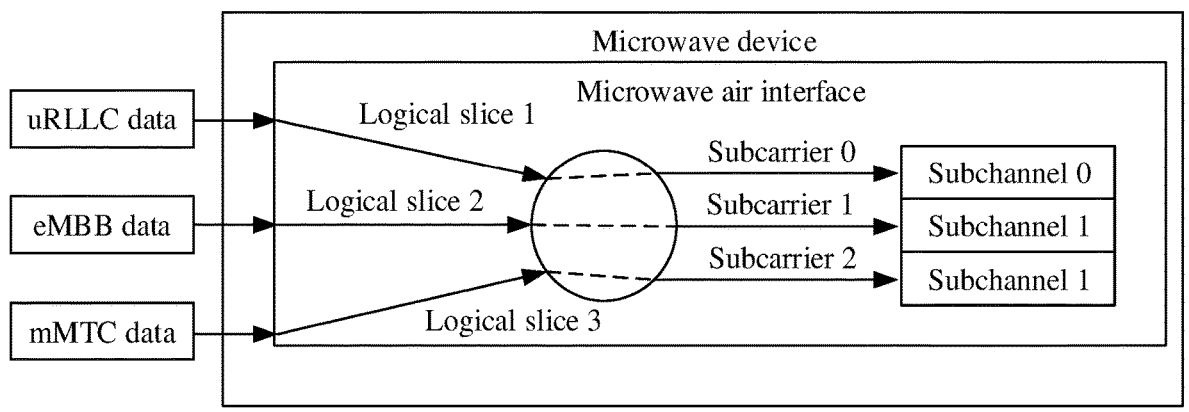
FIG. 7 is a schematic diagram of a process of generating a physical slice in the embodiment shown in FIG. 6.

FIG. 7 is a schematic diagram of a process of generating a physical slice in the embodiment shown in FIG. 6. As shown in FIG. 7, a corresponding subchannel is formed for a logical slice based on a subcarrier, to implement a mapping from the logical slice to the physical slice.

Figure 8:
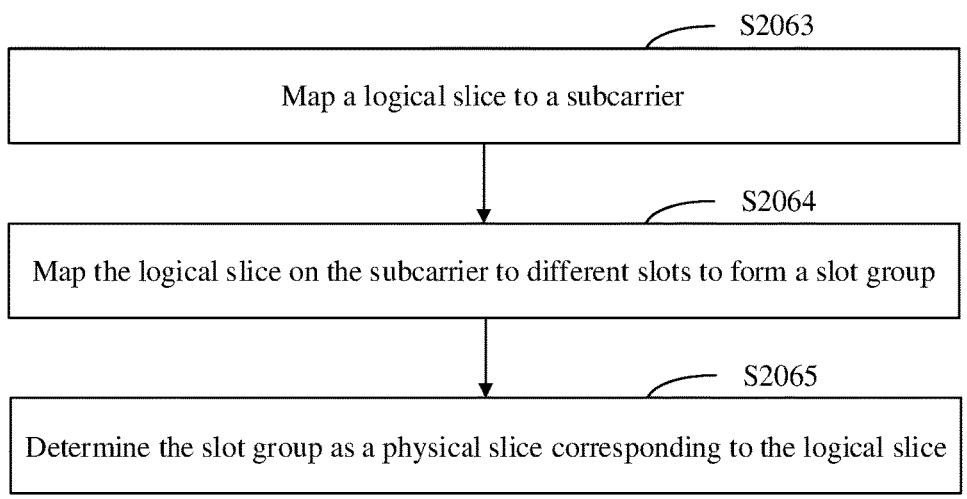
FIG. 8 is a flowchart of another implementation of step S206 in the embodiment shown in FIG. 5.

For example, as shown in FIG. 8, in another possible implementation, the air interface resource includes a subcarrier, the subcarrier includes a plurality of slots, and S206 includes three implementation steps of S2063, S2064, and S2065:

S2063. Map the logical slice to the subcarrier.

S2064. Map the logical slice on the subcarrier to different slots to form a slot group.

S2065. Determine the slot group as the physical slice corresponding to the logical slice.

Figure 9:
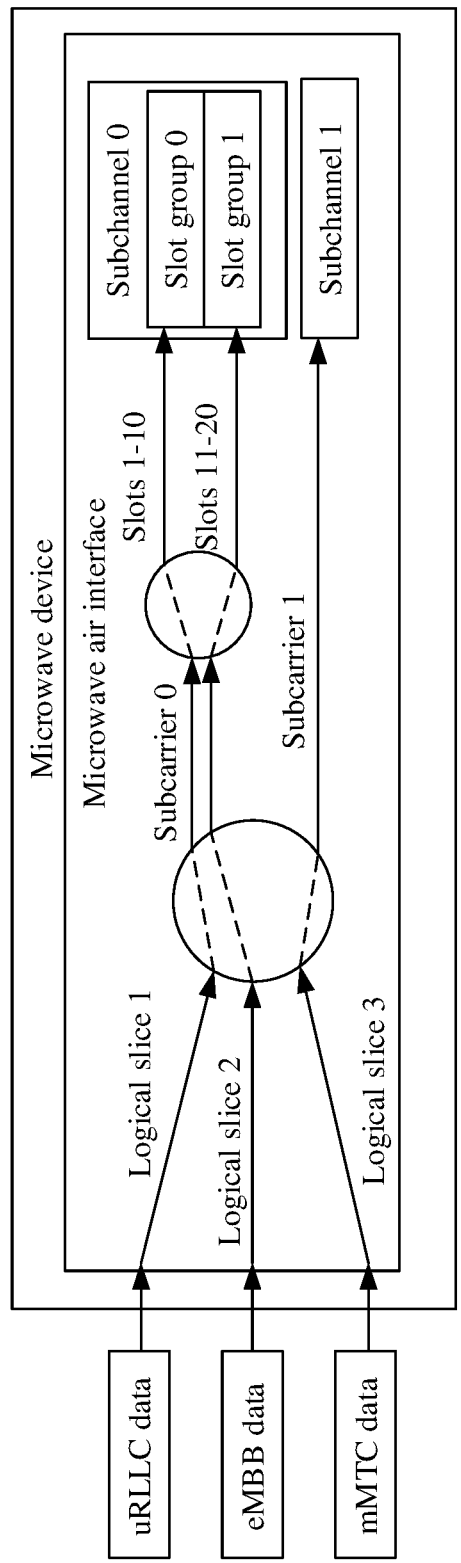
FIG. 9 is a schematic diagram of a process of generating a physical slice in the embodiment shown in FIG. 8.

FIG. 9 is a schematic diagram of a process of generating a physical slice in the embodiment shown in FIG. 8. As shown in FIG. 9, because processing based on a subcarrier is distinguishing different logical slices in a frequency domain dimension, after logical slices are selected based on a subcarrier, the logical slices are further distinguished in a time domain dimension. For example, logical slices carried on different subcarriers are mapped to different slots to form slot groups, and finally, one slot group on different subcarriers corresponds to one physical slice.

In this embodiment, mapping to the subcarrier and then mapping to the slot are performed to generate the physical slice corresponding to logical slice in a plurality of dimensions, so that multi-dimensional slicing is performed on the logical slice, to correspond to different slice types. Therefore, logical slices of more slice types is processed, thereby increasing an application scope of the microwave data processing method provided in some embodiments.

Figure 10:
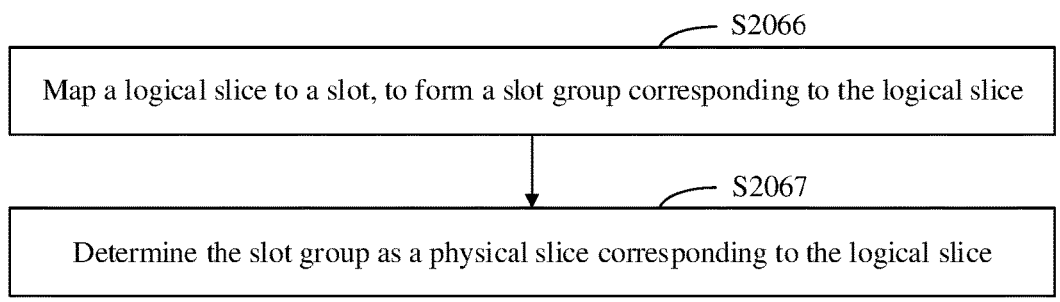
FIG. 10 is a flowchart of still another implementation of step S206 in the embodiment shown in FIG. 5.

For example, as shown in FIG. 10, in still another possible implementation, the air interface resource includes a slot, and S206 includes two implementation steps of S2066 and S2067:

S2066. Map the logical slice to the slot, to form a slot group corresponding to the logical slice.

S2067. Determine the slot group as the physical slice corresponding to the logical slice.

Figure 11:
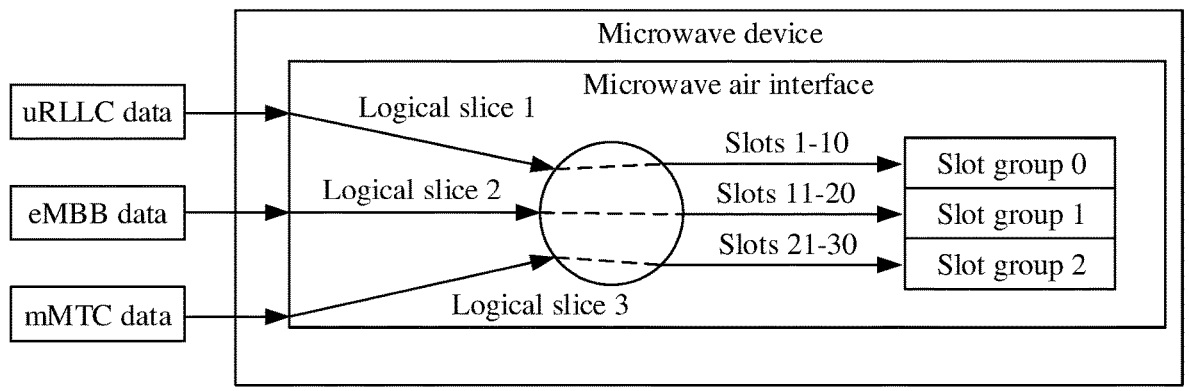
FIG. 11 is a schematic diagram of a process of generating a physical slice in the embodiment shown in FIG. 10.

FIG. 11 is a schematic diagram of a process of generating a physical slice in the embodiment shown in FIG. 10. As shown in FIG. 11, a logical slice is mapped to one or more slots to form a slot group, and each slot group is used as a physical slice for transmitting data. A method for forming a slot group based on a slot is not described herein again.

In this embodiment, the air interface physical resource is allocated to the logical slice by using the slot or the subcarrier as a carrier to carry the logical slice, and slots and subcarriers are independent of each other, so that different logical slices implements corresponding data transmission conditions without being affected by another logical slice, thereby improving stability of data stream transmission.

S207. Obtain an encoding rule of the physical slice based on preset forwarding configuration information.

The forwarding configuration information includes a mapping relationship between a physical slice and an encoding rule. The encoding rule corresponding to the physical slice is determined based on the forwarding configuration information. For example, the forwarding configuration information includes: a subchannel A uses RS encoding, and a slot group B uses LDPC encoding. For example, there is a correspondence between the forwarding configuration information and the slice configuration information, that is, a physical slice identifier in the forwarding configuration information and a physical slice identifier in the slice configuration information is unified. Therefore, based on the forwarding configuration information and the slice configuration information, encoding rules corresponding to different types of microwave data fragments are determined, so that in response to microwave data fragments corresponding to different services being forwarded by using a microwave air interface, corresponding forwarding conditions are met.

S208. Encode the physical slice based on the encoding rule, to obtain encoded data with transmission performance.

For example, the encoding rule includes RS encoding and LDPC encoding, and the encoded data is intermediate frequency data. A implementation of encoding data to form intermediate frequency data with different transmission performance is not described herein.

In this embodiment, physical slices corresponding to different air interface physical resources are encoded based on different encoding rules. Because different encoding rules have corresponding encoding characteristics, encoded data after encoding has transmission performance Therefore, encoded data with transmission performance, for example, low-latency encoded data, is generated by encoding the physical slices by using different encoding rules, and the encoded data meets different data transmission conditions.

Figure 12:
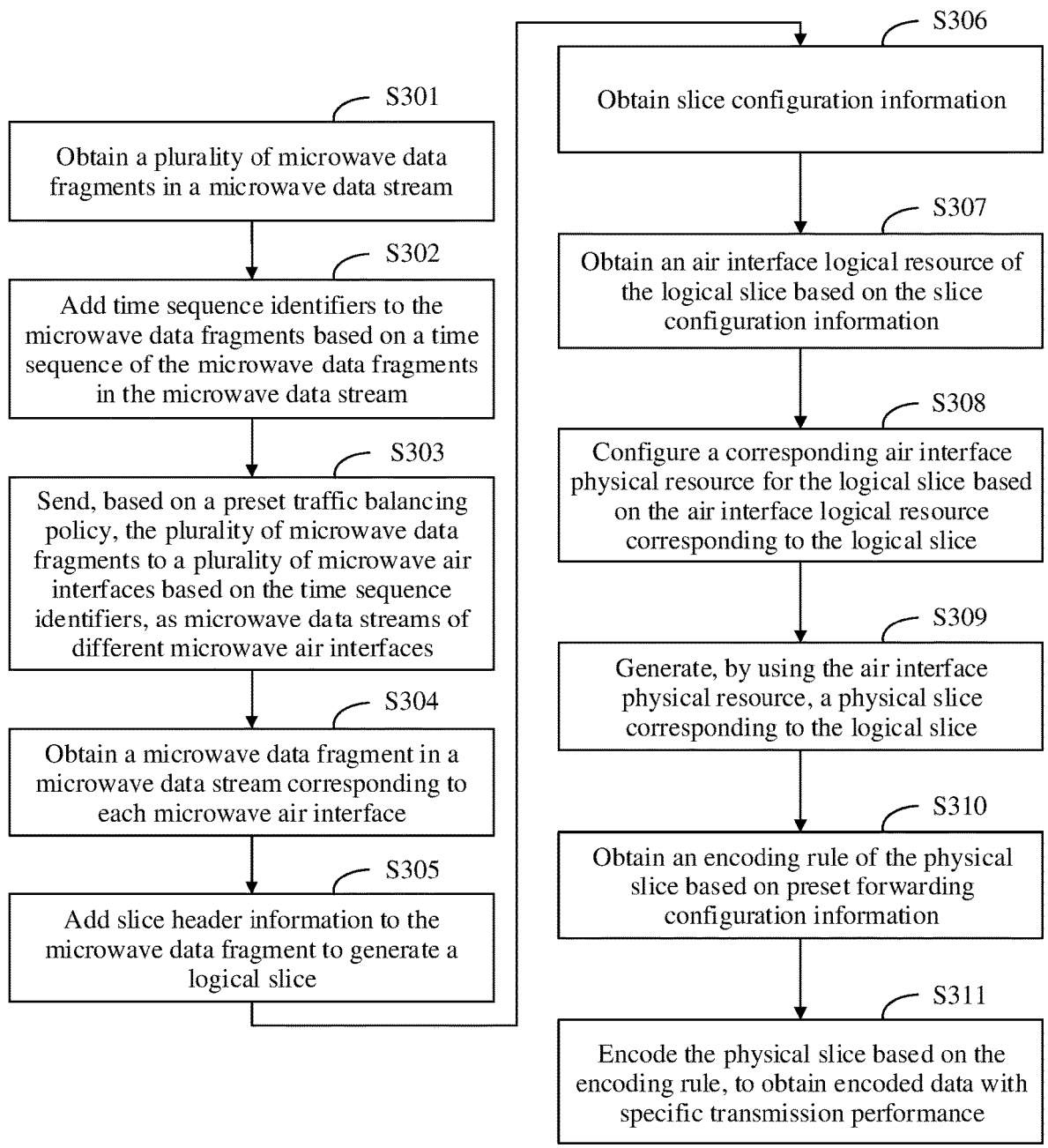
FIG. 12 is a flowchart of still another microwave data processing method according to some embodiments.

FIG. 12 is a flowchart of still another microwave data processing method according to some embodiments. As shown in FIG. 12, in the microwave data processing provided in this embodiment, based on the microwave data processing method provided in the embodiment shown in FIG. 5, before S201, a step of balancing microwave data traffic in a plurality of microwave air interfaces is added, to be applied to a multi-microwave air interface transmission solution based on a link aggregation technology. The method includes the following steps.

S301. Obtain a plurality of microwave data fragments in a microwave data stream.

S302. Add time sequence identifiers to the microwave data fragments based on a time sequence of the microwave data fragments in the microwave data stream.

Specifically, in the multi-microwave air interface transmission solution based on the link aggregation technology, a plurality of microwave air interfaces are bundled into a larger data transmission pipeline, to jointly transmit microwave data. A microwave data stream accessed by a data input port includes a plurality of microwave data fragments. The plurality of microwave data fragments need to be allocated to different microwave air interfaces for processing and data transmission, and the microwave air interfaces have different latencies. Therefore, the original microwave data stream requires sequence preserving, that is, time sequence identifiers are added to the microwave data fragments based on a time sequence of the microwave data fragments in the microwave data stream, so that in response to being sent through a plurality of microwave air interfaces, the microwave data fragments still is sent in the sequence of the microwave data fragments in the original microwave data stream.

Specifically, there are a plurality of implementation methods for adding a time sequence identifier to a microwave data fragment. For example, an identification number that represent a time sequence is added to a header or a tail of the microwave data fragment. Implementations are not described one by one.

S303. Send, based on a preset traffic balancing policy, the plurality of microwave data fragments to a plurality of microwave air interfaces based on the time sequence identifiers, as microwave data streams of different microwave air interfaces.

The traffic balancing policy is a policy used to represent how to allocate microwave data streams to a plurality of microwave air interfaces, and there is a mapping relationship between the traffic balancing policy and air interface resources of the microwave air interfaces. For example, in the plurality of microwave air interfaces, a microwave air interface with a larger quantity of air interface resources is allocated a larger amount of data traffic, and a microwave air interface with a smaller quantity of air interface resources is allocated a smaller amount of data traffic, to balance traffic in the plurality of microwave air interfaces.

Figure 13:
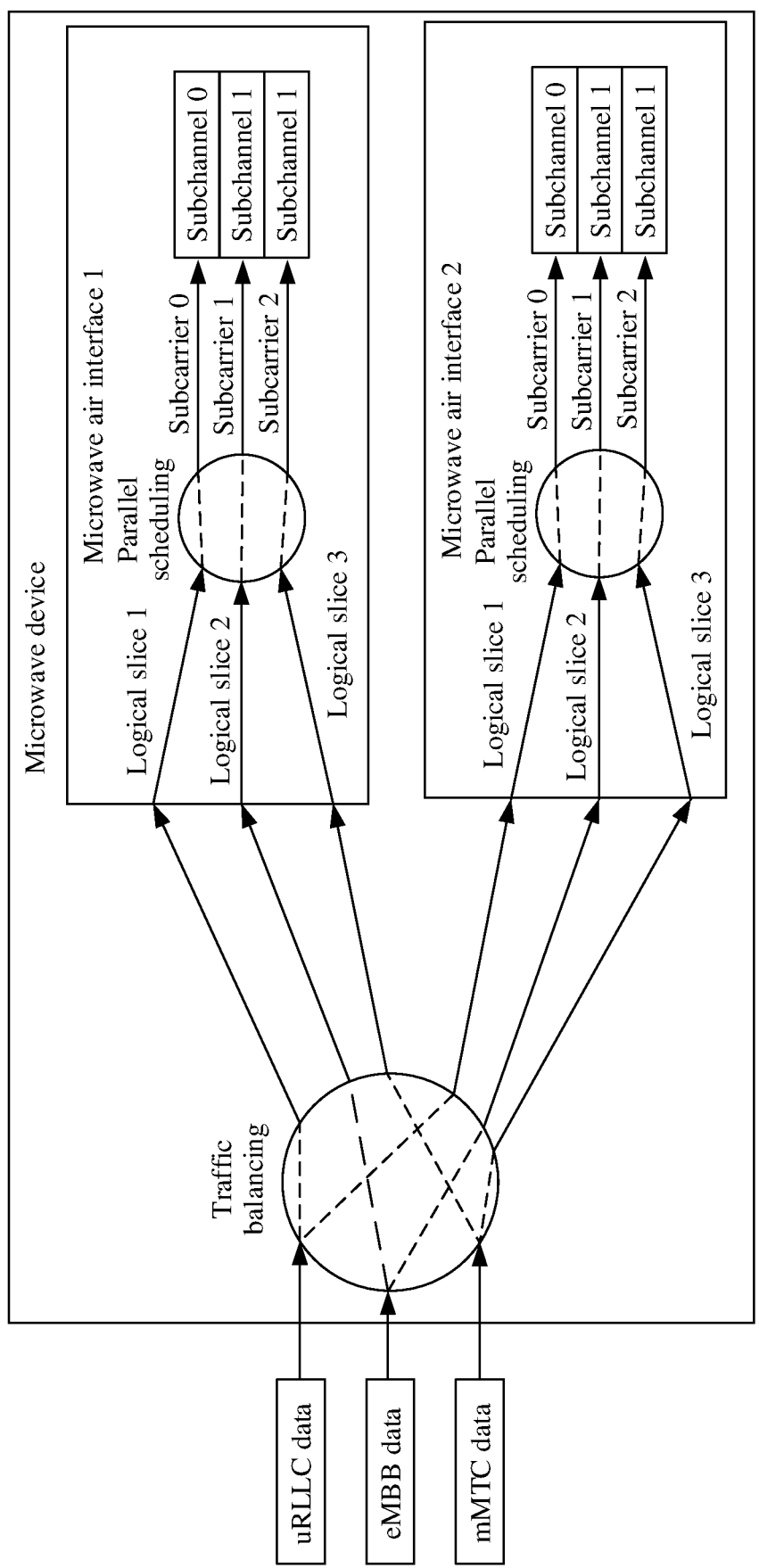
FIG. 13 is a schematic diagram of sending microwave data streams to a plurality of microwave air interfaces according to some embodiments.

FIG. 13 is a schematic diagram of sending microwave data streams to a plurality of microwave air interfaces according to some embodiments. After each microwave air interface receives a microwave data fragment distributed based on the traffic balancing policy, each microwave air interface receives one or more microwave data fragments. The one or more microwave data fragments are equivalent to a microwave data stream for each microwave air interface. Each microwave air interface performs, based on the microwave data stream, the microwave data processing method provided in the embodiment corresponding to FIG. 3 or FIG. 5. In this embodiment, data traffic of a corresponding size is allocated based on an air interface resource of each microwave air interface. Therefore, subsequently, in response to a microwave data stream being processed to form a logical slice and an independent air interface resource is allocated, utilization of the air interface resource is higher, an air interface resource shortage or surplus is avoided in response to each microwave air interface allocating an air interface resource to a logical slice, and utilization of the air interface resource is improved in response to data transmission with differential latencies being performed by the microwave air interface.

In this embodiment, in a scenario in which a plurality of microwave air interfaces are bundled as a whole for microwave data transmission, microwave data fragments are out of sequence during multi-path transmission, and time sequence identifiers are added to microwave data fragment in a microwave data stream, to preserve a sequence of the microwave data fragments. Then, the microwave data fragments after the sequence preserving are sent to a plurality of microwave air interfaces based on a preset traffic balancing policy, so that the plurality of microwave air interfaces obtains microwave data streams after traffic balancing. Because the microwave data streams obtained by the plurality of microwave air interfaces are related to air interface resources of the plurality of microwave air interfaces, balance of subsequent air interface resource allocation performed by the plurality of microwave air interfaces is improved, thereby improving comprehensive transmission efficiency of microwave data.

S304. Obtain a microwave data fragment in a microwave data stream corresponding to each microwave air interface.

S305. Add slice header information to the microwave data fragment to generate a logical slice.

S306. Obtain slice configuration information.

S307. Obtain an air interface logical resource of the logical slice based on the slice configuration information.

S308. Configure a corresponding air interface physical resource for the logical slice based on the air interface logical resource corresponding to the logical slice.

S309. Generate, by using the air interface physical resource, a physical slice corresponding to the logical slice.

S310. Obtain an encoding rule of the physical slice based on preset forwarding configuration information.

S311. Encode the physical slice based on the encoding rule, to obtain encoded data with transmission performance.

In this embodiment, implementations of S304 to S311 are the same as implementations of S201 to S208 in the embodiment shown in FIG. 5 of the embodiments, and details are not described herein one by one.

The microwave data processing method in the embodiments is described in detail above, and a microwave data processing apparatus in the embodiments is described below.

Figure 14:
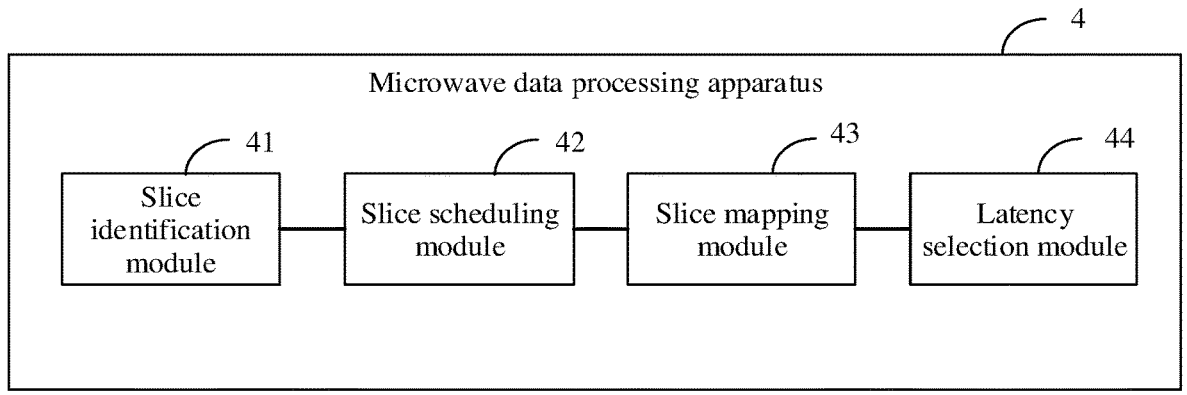
FIG. 14 is a schematic block diagram of a microwave data processing apparatus according to some embodiments.

In an example, FIG. 14 is a schematic block diagram of a microwave data processing apparatus according to some embodiments. The microwave data processing apparatus 4 in some embodiments are the microwave device in the foregoing method embodiment, or a microwave indoor unit, or is one or more chips in the microwave device or the microwave indoor unit. The microwave data processing apparatus 4 is configured to perform some or functions of the microwave data processing method in the foregoing method embodiment. The microwave data processing apparatus 4 includes the following modules.

A slice identification module 41 is configured to perform slicing processing on an obtained microwave data stream to obtain a logical slice. The slice identification module 41 performs step S101 of the method shown in FIG. 3.

A slice scheduling module 42 is configured to configure an independent air interface resource for the logical slice based on a slice type of the logical slice. The slice scheduling module 42 performs step S102 of the method shown in FIG. 3.

A slice mapping module 43 is configured to generate, by using the air interface resource, a physical slice corresponding to the logical slice. The slice mapping module 43 performs step S103 of the method shown in FIG. 3.

A latency selection module 44 is configured to encode the physical slice based on preset forwarding configuration information, to generate encoded data that meets a data transmission precondition. The latency selection module 44 performs step S104 of the method shown in FIG. 3.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

In some embodiments, the air interface resource includes an air interface logical resource and an air interface physical resource, and the slice scheduling module 42 is specifically configured to: obtain slice configuration information, where the slice configuration information is used to represent a mapping relationship between a slice type and an air interface logical resource; obtain an air interface logical resource of the logical slice based on the slice configuration information, where different air interface logical resources are independent of each other; and configure a corresponding air interface physical resource for the logical slice based on the air interface logical resource corresponding to the logical slice. In this case, the slice scheduling module 42 performs steps S203 to S205 in the method shown in FIG. 5, or performs steps S306 to S308 of the method shown in FIG. 12.

In some embodiments, a mapping between a slice type and an air interface logical resource is established by obtaining the configuration information used to represent the mapping relationship between a slice type and an air interface logical resource, and the air interface logical resource is configured for the logical slice based on the slice type of the logical slice and the mapping relationship. Then, the air interface physical resource is configured based on the air interface logical resource. Because air interface logical resources are independent of each other, that data is forwarded for different types of logical slices by using independent air interface physical resources, thereby meeting different data transmission conditions.

In some embodiments, the logical slice includes slice header information, and the slice header information is used to represent the slice type of the logical slice. The slice configuration information includes the mapping relationship between a slice type and an air interface logical resource. In response to obtaining the air interface logical resource of the logical slice based on the slice configuration information, the slice scheduling module 42 is specifically configured to: obtain the slice type of the logical slice based on the slice header information; and obtain the air interface logical resource of the logical slice based on the slice configuration information and the slice type of the logical slice. In this case, the slice scheduling module 42 performs step S204 in the method shown in FIG. 5, or performs step S307 of the method shown in FIG. 12.

In some embodiments, the type of the logical slice is described in the slice header information in the logical slice, to distinguish between different types of logical slices and allocate air interface resources to different types of logical slices. Because the slice header information is configured based on a precondition, the slice type is flexibly described and extended in a manner in which the slice header information represents the slice type, thereby increasing an application scope and flexibility of the microwave data processing method provided in some embodiments.

In some embodiments, an identifier of the air interface logical resource is in a one-to-one correspondence with an identifier of the air interface physical resource, and the air interface physical resource includes a slot and/or a subcarrier. In response to configuring the air interface physical resource for the logical slice based on the air interface logical resource, the slice scheduling module 42 is specifically configured to: obtain an identifier of the air interface physical resource based on an identifier of the air interface logical resource of the logical slice; and configure a slot and/or a subcarrier for the logical slice by using the air interface physical resource corresponding to the identifier of the air interface physical resource. In this case, the slice scheduling module 42 performs step S205 in the method shown in FIG. 5, or performs step S308 of the method shown in FIG. 12.

In some embodiments, the air interface physical resource is allocated to the logical slice by using the slot or the subcarrier as a carrier to carry the logical slice, and slots and subcarriers are independent of each other, so that different logical slices implements corresponding data transmission conditions without being affected by another logical slice, thereby improving stability of data stream transmission.

In some embodiments, the air interface resource includes a subcarrier, and the slice mapping module 43 is specifically configured to: map the logical slice to the subcarrier to form a subchannel, where the logical slice is in a one-to-one correspondence with the subchannel; and determine the subchannel as the physical slice corresponding to the logical slice. In this case, the slice mapping module 43 performs step S206 in the method shown in FIG. 5, or performs steps S2061 and S2062 of the method shown in FIG. 6, or performs step S309 of the method shown in FIG. 12.

In some embodiments, the subcarrier includes a plurality of slots. After mapping the logical slice to the subcarrier, the slice mapping module 43 is specifically configured to: map the logical slice on the subcarrier to the slots to form a slot group; and determine the slot group as the physical slice corresponding to the logical slice. In this case, the slice mapping module 43 performs step S206 in the method shown in FIG. 5, or performs steps S2063 to S2065 of the method shown in FIG. 8, or performs step S309 of the method shown in FIG. 12.

In some embodiments, the air interface resource includes a slot. The slice mapping module 43 is specifically configured to: map the logical slice to the slot, to form a slot group corresponding to the logical slice; and determine the slot group as the physical slice corresponding to the logical slice. In this case, the slice scheduling module slice mapping module 43 in the method shown in FIG. 5, or performs steps S2066 and S2067 of the method shown in FIG. 10, or performs step S309 of the method shown in FIG. 12.

In some embodiments, the subcarrier and then the slot are used to generate the physical slice corresponding to the logical slice in a plurality of dimensions, so that multi-dimensional slicing is performed on the logical slice, to correspond to different slice types. Therefore, logical slices of more slice types is processed, thereby increasing an application scope of the microwave data processing method provided in some embodiments.

In some embodiments, the microwave data stream includes a microwave data fragment, and the slice identification module 41 is specifically configured to: obtain the microwave data fragment; identify the microwave data fragment based on a preset slice matching rule to obtain a slice feature; and add slice header information to the microwave data fragment based on the slice feature to generate a logical slice, where the logical slice is in a one-to-one correspondence with the microwave data fragment. In this case, the slice identification module 41 performs steps S201 and S202 in the method shown in FIG. 5, or performs steps S303 to S305 of the method shown in FIG. 12.

In some embodiments, the forwarding configuration information includes a mapping relationship between a physical slice and an encoding rule, and the latency selection module 44 is specifically configured to: obtain an encoding rule of the physical slice based on the forwarding configuration information; and encode the physical slice based on the encoding rule, to obtain encoded data with transmission performance. In this case, the latency selection module 44 performs steps S207 and S208 in the method shown in FIG. 5, or performs steps S310 and S311 of the method shown in FIG. 12.

In some embodiments, physical slices corresponding to different air interface physical resources are encoded based on different encoding rules. Because different encoding rules have corresponding encoding characteristics, encoded data after encoding has transmission performance Therefore, encoded data with transmission performance, for example, low-latency encoded data, is generated by encoding the physical slices by using different encoding rules, and the encoded data meets different data transmission conditions.

In some embodiments, the encoding rule is RS encoding and/or LDPC encoding.

The microwave data processing apparatus 4 in the embodiment shown in FIG. 14 is configured to perform the technical solution in any embodiment shown in FIG. 3 or FIG. 5 in the foregoing methods. Implementation principles and technical effects thereof are similar, and details are not described herein again.

Figure 15:
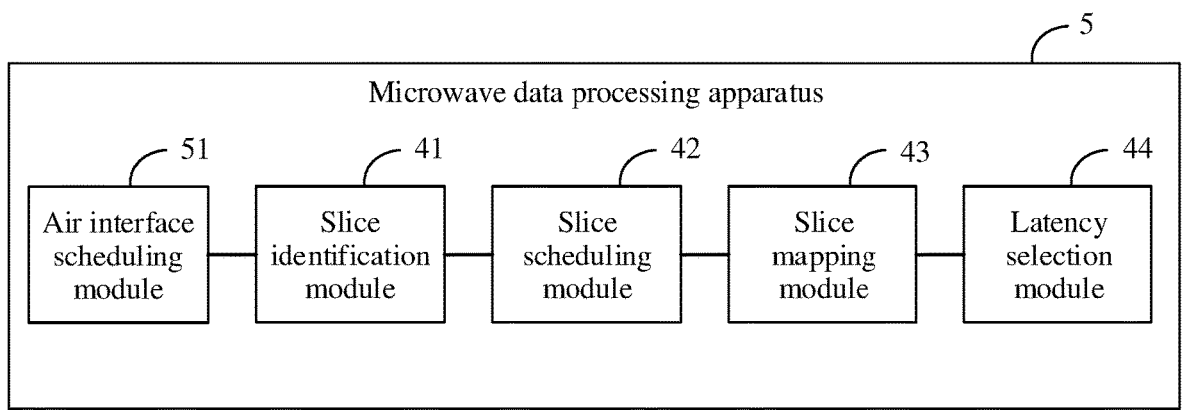
FIG. 15 is a schematic block diagram of another microwave data processing apparatus according to some embodiments.

In another example, FIG. 15 is a schematic block diagram of another microwave data processing apparatus according to some embodiments. Based on the apparatus shown in FIG. 14, as shown in FIG. 15, the microwave data processing apparatus 5 further includes:

an air interface scheduling module 51, configured to: obtain a plurality of microwave data fragments; add time sequence identifiers to the microwave data fragments based on a time sequence of the microwave data fragments in the microwave data stream; and send, based on a preset traffic balancing policy, the plurality of microwave data fragments to a plurality of microwave air interfaces based on the time sequence identifiers, as microwave data streams of different microwave air interfaces, where there is a mapping relationship between the traffic balancing policy and air interface resources of the microwave air interfaces. The air interface scheduling module 51 performs steps S301 to S303 of the method shown in FIG. 12.

In some embodiments, in a scenario in which a plurality of microwave air interfaces are bundled as a whole for microwave data transmission, microwave data fragments are out of sequence during multi-path transmission, and time sequence identifiers are added to microwave data fragment in a microwave data stream, to preserve a sequence of the microwave data fragments. Then, the microwave data fragments after the sequence preserving are sent to a plurality of microwave air interfaces based on a preset traffic balancing policy, so that the plurality of microwave air interfaces obtains microwave data streams after traffic balancing. Because the microwave data streams obtained by the plurality of microwave air interfaces are related to air interface resources of the plurality of microwave air interfaces, balance of subsequent air interface resource allocation performed by the plurality of microwave air interfaces is improved, thereby improving comprehensive transmission efficiency of microwave data.

The microwave data processing apparatus 5 in the embodiment shown in FIG. 15 is configured to perform the technical solution in any embodiment shown in FIG. 3, FIG. 5, or FIG. 12 in the foregoing methods. Implementation principles and technical effects thereof are similar, and details are not described herein again.

In addition, implementation of this embodiment does not depend on whether the embodiment shown in FIG. 14 is implemented, and this embodiment is implemented independently.

Figure 16:
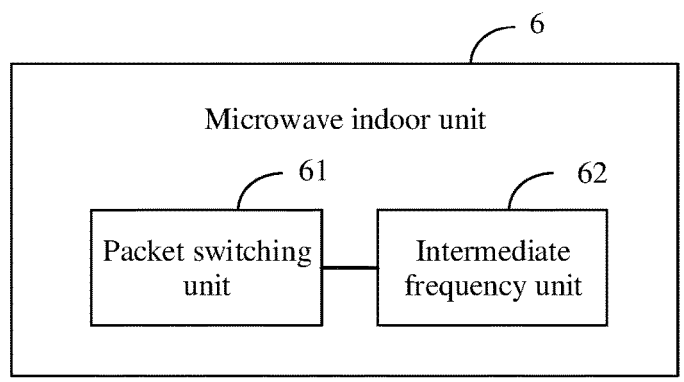
FIG. 16 is a schematic block diagram of a structure of a microwave indoor unit according to some embodiments.

FIG. 16 is a schematic block diagram of a structure of a microwave indoor unit according to some embodiments. As shown in FIG. 16, the microwave indoor unit 6 includes a packet switching unit 61 and an intermediate frequency unit 62, and the packet switching unit 61 and the intermediate frequency unit 62 are electrically connected.

The packet switching unit 61 is configured to perform slicing processing on an obtained microwave data stream to obtain a logical slice. In this case, the packet switching unit 61 performs step S101 of the method shown in FIG. 3.

The intermediate frequency unit 62 is configured to: configure an independent air interface resource for the logical slice based on a slice type of the logical slice, generate, by using the air interface resource, a physical slice corresponding to the logical slice, and encode the physical slice based on preset forwarding configuration information, to generate encoded data that meets a data transmission precondition. In this case, the intermediate frequency unit 62 performs steps S102 to S104 of the method shown in FIG. 3.

In some embodiments, the logical slice is obtained by slicing the microwave data stream, and the independent air interface resource is allocated to the logical slice, so that different logical slices are independent of each other, and then different logical slices are correspondingly encoded, so that encoded data that meets different transmission conditions is generated for different types of logical slices, thereby resolving a problem that a data transmission precondition is unable to be met because data in a microwave data stream is unable to have differentiated latencies due to sharing an air interface resource, improving reliability of microwave data transmission, and increasing application scenarios of microwave data transmission.

In some embodiments, the air interface resource includes an air interface logical resource and an air interface physical resource, and the intermediate frequency unit 62 is specifically configured to: obtain slice configuration information, where the slice configuration information is used to represent a mapping relationship between a slice type and an air interface logical resource; obtain an air interface logical resource of the logical slice based on the slice configuration information, where different air interface logical resources are independent of each other; and configure a corresponding air interface physical resource for the logical slice based on the air interface logical resource corresponding to the logical slice. In this case, the intermediate frequency unit 62 performs steps S203 to S205 in the method shown in FIG. 5, or performs steps S306 to S308 of the method shown in FIG. 12.

In some embodiments, the logical slice includes slice header information, and the slice header information is used to represent the slice type of the logical slice. The slice configuration information includes the mapping relationship between a slice type and an air interface logical resource. In response to obtaining the air interface logical resource of the logical slice based on the slice configuration information, the intermediate frequency unit 62 is specifically configured to: obtain the slice type of the logical slice based on the slice header information; and obtain the air interface logical resource of the logical slice based on the slice configuration information and the slice type of the logical slice. In this case, the intermediate frequency unit 62 performs step S204 in the method shown in FIG. 5, or performs step S307 of the method shown in FIG. 12.

In some embodiments, an identifier of the air interface logical resource is in a one-to-one correspondence with an identifier of the air interface physical resource, and the air interface physical resource includes a slot and/or a subcarrier. In response to configuring the air interface physical resource for the logical slice based on the air interface logical resource, the intermediate frequency unit 62 is specifically configured to: obtain an identifier of the air interface physical resource based on an identifier of the air interface logical resource of the logical slice; and configure a slot and/or a subcarrier for the logical slice by using the air interface physical resource corresponding to the identifier of the air interface physical resource. In this case, the intermediate frequency unit 62 performs step S205 in the method shown in FIG. 5, or performs step S308 of the method shown in FIG. 12.

In some embodiments, the air interface resource includes a subcarrier, and in response to generating, by using the air interface resource, the physical slice corresponding to the logical slice, the intermediate frequency unit 62 is specifically configured to: map the logical slice to the subcarrier to form a subchannel, where the logical slice is in a one-to-one correspondence with the subchannel; and determine the subchannel as the physical slice corresponding to the logical slice. In this case, the intermediate frequency unit 62 performs step S206 in the method shown in FIG. 5, or performs steps S2061 and S2062 of the method shown in FIG. 6, or performs step S309 of the method shown in FIG. 12.

In some embodiments, the subcarrier includes a plurality of slots. After mapping the logical slice to the subcarrier, the intermediate frequency unit 62 is specifically configured to: map the logical slice on the subcarrier to the slots to form a slot group; and determine the slot group as the physical slice corresponding to the logical slice. In this case, the intermediate frequency unit 62 performs step S206 in the method shown in FIG. 5, or performs steps S2063 to S2065 of the method shown in FIG. 8, or performs step S309 of the method shown in FIG. 12.

In some embodiments, the air interface resource includes a slot, and in response to generating, by using the air interface resource, the physical slice corresponding to the logical slice, the intermediate frequency unit 62 is specifically configured to: map the logical slice to the slot, to form a slot group corresponding to the logical slice; and determine the slot group as the physical slice corresponding to the logical slice. In this case, the intermediate frequency unit 62 performs step S206 in the method shown in FIG. 5, or performs steps S2066 and S2067 of the method shown in FIG. 10, or performs step S309 of the method shown in FIG. 12.

In some embodiments, the packet switching unit 61 is specifically configured to: obtain a microwave data fragment; identify the microwave data fragment based on a preset slice matching rule to obtain a slice feature; and add slice header information to the microwave data fragment based on the slice feature to generate a logical slice, where the logical slice is in a one-to-one correspondence with the microwave data fragment. In this case, the packet switching unit 61 performs steps S201 and S202 in the method shown in FIG. 5, or performs steps S303 to S305 of the method shown in FIG. 12.

In some embodiments, the forwarding configuration information includes a mapping relationship between a physical slice and an encoding rule, and in response to encoding the physical slice based on the preset forwarding configuration information, to generate the encoded data that meets the data transmission precondition, the intermediate frequency module 62 is specifically configured to: obtain an encoding rule of the physical slice based on the forwarding configuration information; and encode the physical slice based on the encoding rule, to obtain encoded data with transmission performance. In this case, the intermediate frequency module 62 performs steps S207 and S208 in the method shown in FIG. 5, or performs steps S310 and S311 of the method shown in FIG. 12.

In some embodiments, the encoding rule is RS encoding and/or LDPC encoding.

In some embodiments, physical slices corresponding to different air interface physical resources are encoded based on different encoding rules. Because different encoding rules have corresponding encoding characteristics, encoded data after encoding has transmission performance Therefore, encoded data with transmission performance, for example, low-latency encoded data, is generated by encoding the physical slices by using different encoding rules, and the encoded data meets different data transmission conditions.

The microwave indoor unit 6 in the embodiment shown in FIG. 16 is configured to perform the technical solution in any embodiment shown in FIG. 3 or FIG. 5 in the foregoing methods. Implementation principles and technical effects thereof are similar, and details are not described herein again.

Figure 17:
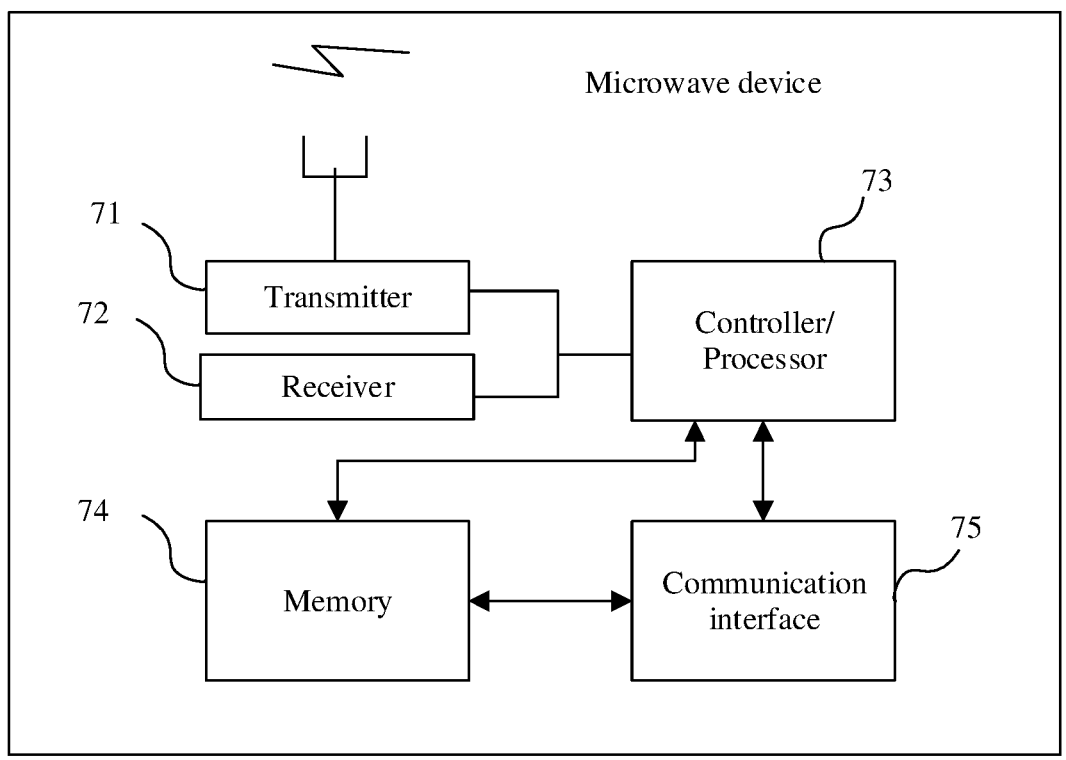
FIG. 17 is a schematic block diagram of a structure of a microwave device according to some embodiments.

FIG. 17 is a schematic block diagram of a structure of a microwave device according to some embodiments. As shown in FIG. 17, the microwave device includes a transmitter 71, a receiver 72, and a processor 73.

The processor 73 is configured to perform steps in FIG. 3, or the processor 73 is configured to perform steps in FIG. 5, or the processor 73 is configured to perform steps in FIG. 12. The processor 73 is configured to implement modules in FIG. 14, FIG. 15, and FIG. 16.

The microwave device in the embodiment shown in FIG. 17 is configured to perform the technical solutions in the foregoing method embodiments, or programs of the modules in the embodiments shown in FIG. 14, FIG. 15, and FIG. 16. The processor 73 invokes the programs to perform operations in the foregoing method embodiments, to implement the modules shown in FIG. 14, FIG. 15, and FIG. 16.

The processor 73 further is a controller, and is represented as a "controller/processor 73" in FIG. 17. The transmitter 71 and the receiver 72 are configured to support information sending and receiving between the microwave device and devices in the network environment in the foregoing embodiment, and support communication between the microwave device and the devices in the network environment in the foregoing embodiment.

Further, the microwave device further includes a memory 74, and the memory 74 is configured to store program code and data of the microwave device. Further, the network device further includes a communications interface 75.

The processor 73, for example, a central processing unit (CPU), is one or more integrated circuits configured to implement the foregoing method, for example, one or more application-specific integrated circuits (ASIC), one or more microprocessors (DSPs), or one or more field programmable gate arrays (FPGA). The storage element 74 is one memory, or is a general term of a plurality of storage elements.

In some embodiments, corresponding to the foregoing method embodiments, the transmitter 71 included in the microwave device in FIG. 17 provided in this embodiment of this application performs a sending action, the processor 73 performs a processing action, and the receiver 72 performs a receiving action. For details, refer to the foregoing method embodiments.

Some embodiments further provides a computer-readable storage medium, including computer code. In response to the computer code being run on a computer, the computer is enabled to perform the method provided in any implementation corresponding to FIG. 3 to FIG. 12.

Some embodiments further provides a computer program product, including program code. In response to the computer running the computer program product, the program code performs the method provided in any implementation corresponding to FIG. 2 to FIG. 12.

Some embodiments further provides a chip, including a processor. The processor is configured to invoke and run a computer program stored in a memory, to perform a corresponding operation and/or procedure performed by the microwave device in the microwave data processing method provided in any implementation corresponding to FIG. 2 to FIG. 12. Optionally, the chip further includes the memory. The memory and the processor are connected by using a circuit or a wire, and the processor is configured to read the computer program in the memory and execute the computer program. Further, optionally, the chip further includes a communications interface, and the processor is connected to the communications interface. The communications interface is configured to receive data and/or information that needs to be processed. The processor obtains the data and/or information from the communications interface, and processes the data and/or information. The communications interface is an input/output interface. All or some of the foregoing embodiments are implemented by using software, hardware, firmware, or any combination thereof. In response to software being used to implement the embodiments, all or a part of the embodiments are implemented in a form of a computer program product. The computer program product includes one or more computer instructions. In response to the computer program instructions being loaded and executed on a computer, all or some of the procedures or functions according to embodiments are generated. The computer is a general-purpose computer, a dedicated computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (SSD)), or the like.

A person skilled in the art is able to be aware that in the foregoing one or more examples, functions described in embodiments is implemented by hardware, software, firmware, or any combination thereof. In response to the functions being implemented by software, the foregoing functions are stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium is any available medium accessible to a general-purpose or a special-purpose computer.

What is claimed is:

1. A microwave data processing method, comprising:
performing slicing processing on an obtained microwave data stream to obtain a logical slice, wherein the slicing processing comprises:
inserting slice header information into each data fragment of the obtained microwave data stream, wherein the slice header information is determined based on service data of the corresponding data fragment;
configuring an independent air interface resource for the logical slice based on a slice type of the logical slice;
generating, by using the air interface resource, a physical slice corresponding to the logical slice; and
encoding the physical slice based on preset forwarding configuration information to generate encoded data that meets a data transmission requirement.

2. The method according to claim 1, wherein:
the air interface resource includes an air interface logical resource and an air interface physical resource, and the configuring the independent air interface resource for the logical slice based on the slice type of the logical slice comprises:
obtaining slice configuration information, wherein the slice configuration information is used to represent a mapping relationship between a slice type and the air interface logical resource;
obtaining an air interface logical resource of the logical slice based on the slice configuration information, wherein different air interface logical resources are independent of each other; and
configuring a corresponding air interface physical resource for the logical slice based on the air interface logical resource corresponding to the logical slice.

3. The method according to claim 2, wherein:
the logical slice includes the slice header information that is used to represent the slice type of the logical slice;
the slice configuration information includes the mapping relationship between a slice type and the air interface logical resource; and
the obtaining the air interface logical resource of the logical slice based on the slice configuration information comprises:
obtaining the slice type of the logical slice based on the slice header information; and
obtaining the air interface logical resource of the logical slice based on the slice configuration information and the slice type of the logical slice.

4. The method according to 3, wherein:
an identifier of the air interface logical resource is in a one-to-one correspondence with an the air interface physical resource, and the air interface physical resource includes a slot or a subcarrier; and
the configuring an air interface physical resource for the logical slice based on the air interface logical resource comprises:
obtaining the identifier of the air interface physical resource based on the identifier of the air interface logical resource of the logical slice; and
configuring the slot or a subcarrier for the logical slice by using the air interface physical resource corresponding to the identifier of the air interface physical resource.

5. The method according to claim 1, wherein:
the air interface resource includes a slot, and the generating, by using the air interface resource, the physical slice corresponding to the logical slice comprises:
mapping the logical slice to slots, to form a slot group corresponding to the logical slice; and
determining the slot group as the physical slice corresponding to the logical slice.

6. The method according to claim 5, wherein:
the microwave data stream includes a microwave data fragment, and the performing slicing processing on the obtained microwave data stream to obtain the logical slice comprises:
obtaining the microwave data fragment; and
identifying the microwave data fragment based on a preset slice matching rule to obtain a slice feature.

7. The method according to claim 6, wherein:
forwarding configuration information includes a mapping relationship between the physical slice and an encoding rule, and the encoding the physical slice based on the preset forwarding configuration information, to generate the encoded data that meets the data transmission requirement comprises:
obtaining an encoding rule of the physical slice based on the forwarding configuration information; and
encoding the physical slice based on the encoding rule, to obtain encoded data with specific transmission performance.

8. The method according to claim 7, wherein the encoding rule is Reed-Solomon (RS) encoding or low-density parity-check (LDPC) encoding.

9. The method according to claim 8, wherein:
the microwave data stream includes a plurality of microwave data fragments, and before the performing slicing processing on the obtained microwave data stream to obtain the logical slice, the method further comprises:
obtaining the plurality of microwave data fragments;
adding time sequence identifiers to the microwave data fragments based on a time sequence of the microwave data fragments in the microwave data stream; and
sending, based on a preset traffic balancing policy, the plurality of microwave data fragments to a plurality of microwave air interfaces based on the time sequence identifiers, as microwave data streams of different microwave air interfaces, where there is a mapping relationship between the traffic balancing policy and air interface resources of the microwave air interfaces.

10. A microwave data processing method, comprising:
performing slicing processing on an obtained microwave data stream to obtain a logical slice;
configuring an independent air interface resource for the logical slice based on a slice type of the logical slice;
generating, by using the air interface resource, a physical slice corresponding to the logical slice; and
encoding the physical slice based on preset forwarding configuration information to generate encoded data that meets a data transmission requirement, wherein:
the air interface resource includes a subcarrier, and the generating, by using the air interface resource, the physical slice corresponding to the logical slice comprises:

mapping the logical slice to the subcarrier to form a subchannel, wherein the logical slice is in a one-to-one correspondence with the subchannel; and
determining the subchannel as the physical slice corresponding to the logical slice.

11. The method according to claim 10, wherein:
the subcarrier includes a plurality of slots, and after the mapping the logical slice to the subcarrier, the method further comprises:
mapping the logical slice on the subcarrier to the slots to form a slot group; and
determining the slot group as the physical slice corresponding to the logical slice.

12. A microwave data processing apparatus, comprises:
a processor configured to:
perform slicing processing on an obtained microwave data stream to obtain a logical slice, wherein the slicing processing comprises:
insert slice header information into each data fragment of the obtained microwave data stream, wherein the slice header information is determined based on service data of the corresponding data fragment;
configure an independent air interface resource for the logical slice based on a slice type of the logical slice;
generate, by using the air interface resource, a physical slice corresponding to the logical slice; and
encode the physical slice based on preset forwarding configuration information, to generate encoded data that meets a data transmission requirement.

13. The apparatus according to claim 12, wherein:
the air interface resource includes an air interface logical resource and an air interface physical resource, and the processor is configured to:
obtain slice configuration information, wherein the slice configuration information is used to represent a mapping relationship between a slice type and the air interface logical resource;
obtain an air interface logical resource of the logical slice based on the slice configuration information, wherein different air interface logical resources are independent of each other; and
configure a corresponding air interface physical resource for the logical slice based on the air interface logical resource corresponding to the logical slice.

14. The apparatus according to claim 13, wherein:
the logical slice includes the slice header information, and the slice header information is used to represent the slice type of the logical slice; the slice configuration information includes the mapping relationship between a slice type and the air interface logical resource; and
in response to obtaining the air interface logical resource of the logical slice based on the slice configuration information, the processor is configured to:
obtain the slice type of the logical slice based on the slice header information; and
obtain the air interface logical resource of the logical slice based on the slice configuration information and the slice type of the logical slice.

15. The apparatus according to claim 14, wherein:
an identifier of the air interface logical resource is in a one-to-one correspondence with an identifier of the air interface physical resource, and the air interface physical resource includes a slot or a subcarrier; and
in response to configuring the air interface physical resource for the logical slice based on the air interface logical resource, the processor is configured to:
obtain the identifier of the air interface physical resource based on the identifier of the air interface logical resource of the logical slice; and
configure the slot or a subcarrier for the logical slice by using the air interface physical resource corresponding to the identifier of the air interface physical resource.

16. The apparatus according to claim 12, wherein:
the air interface resource includes a subcarrier, and the processor is configured to:
map the logical slice to the subcarrier to form a subchannel, wherein the logical slice is in a one-to-one correspondence with the subchannel; and
determine the subchannel as the physical slice corresponding to the logical slice.

17. The apparatus according to claim 16, wherein:
the subcarrier includes a plurality of slots, and after mapping the logical slice to the subcarrier, the processor is configured to:
map the logical slice on the subcarrier to the slots to form a slot group; and
determine the slot group as the physical slice corresponding to the logical slice.

18. The apparatus according to claim 12, wherein:
the air interface resource includes a slot, and the processor is configured to:
map the logical slice to slots, to form a slot group corresponding to the logical slice; and
determine the slot group as the physical slice corresponding to the logical slice.

19. The apparatus according to claim 18, wherein:
the microwave data stream includes a microwave data fragment, and the processor is configured to:
obtain the microwave data fragment; and
identify the microwave data fragment based on a preset slice matching rule to obtain a slice feature.

20. The apparatus according to claim 19, wherein:
the forwarding configuration information includes a mapping relationship between the physical slice and an encoding rule, and the processor is configured to:
obtain an encoding rule of the physical slice based on the forwarding configuration information; and
encode the physical slice based on the encoding rule to obtain encoded data with specific transmission performance.

* * * * *